United States Patent
Sanghi et al.

(10) Patent No.: US 10,838,450 B2
(45) Date of Patent: Nov. 17, 2020

(54) METHODS AND APPARATUS FOR SYNCHRONIZATION OF TIME BETWEEN INDEPENDENTLY OPERABLE PROCESSORS

(71) Applicant: Apple Inc., Cupertino, CA (US)

(72) Inventors: Karan Sanghi, San Jose, CA (US); Saurabh Garg, San Jose, CA (US)

(73) Assignee: Apple Inc., Cupertino, CA (US)

( * ) Notice: Subject to any disclaimer, the term of this patent is extended or adjusted under 35 U.S.C. 154(b) by 167 days.

(21) Appl. No.: 16/179,233

(22) Filed: Nov. 2, 2018

(65) Prior Publication Data

US 2020/0103932 A1   Apr. 2, 2020

Related U.S. Application Data

(60) Provisional application No. 62/739,002, filed on Sep. 28, 2018.

(51) Int. Cl.
  *G06F 1/12*   (2006.01)
  *G06F 1/32*   (2019.01)
  *G06F 1/324*  (2019.01)

(52) U.S. Cl.
  CPC .............. *G06F 1/12* (2013.01); *G06F 1/324* (2013.01)

(58) Field of Classification Search
  CPC .................................. G06F 1/12; G06F 1/324
  See application file for complete search history.

(56) References Cited

U.S. PATENT DOCUMENTS

| | | |
|---|---|---|
| 4,805,137 A | 2/1989 | Grant et al. |
| 4,949,299 A | 8/1990 | Pickett et al. |
| 5,339,427 A | 8/1994 | Elko et al. |
| 5,367,688 A | 11/1994 | Croll et al. |
| 5,467,459 A | 11/1995 | Alexander et al. |
| 5,613,086 A | 3/1997 | Frey et al. |

(Continued)

FOREIGN PATENT DOCUMENTS

| | | |
|---|---|---|
| EP | 3013008 A1 | 4/2016 |
| JP | 2012108677 A | 6/2012 |

(Continued)

OTHER PUBLICATIONS

Ma, Mingjin, "Principal and Architecture of PCI, PCI-X and PCI Express".

*Primary Examiner* — Stefan Stoynov
(74) *Attorney, Agent, or Firm* — Gazdzinski & Associates, PC

(57) ABSTRACT

Methods and apparatus for synchronization of time between independently operable processors. Time synchronization between independently operable processors is complicated by a variety of factors. For example, neither independently operable processor controls the other processor's task scheduling, power, or clocking. In one exemplary embodiment, a processor can initiates a time synchronization process by disabling power state machines and transacting timestamps for a commonly observed event. In one such embodiment, timestamps may be transferred via inter-processor communication (IPC) mechanisms (e.g., transfer descriptors (TDs), and completion descriptors (CDs)). Both processors may thereafter coordinate in time synchronization efforts (e.g., speeding up or slowing down their respective clocks, etc.).

20 Claims, 10 Drawing Sheets

(56) References Cited

U.S. PATENT DOCUMENTS

| | | |
|---|---|---|
| 5,692,182 A | 11/1997 | Desai et al. |
| 5,708,779 A | 1/1998 | Graziano et al. |
| 5,731,973 A | 3/1998 | Takaishi et al. |
| 5,903,564 A | 5/1999 | Ganmukhi et al. |
| 5,943,507 A | 8/1999 | Cornish et al. |
| 6,216,178 B1 | 4/2001 | Stracovsky et al. |
| 6,233,702 B1 | 5/2001 | Horst et al. |
| 6,260,152 B1 | 7/2001 | Cole et al. |
| 6,434,633 B1 | 8/2002 | Braun et al. |
| 6,466,898 B1 | 10/2002 | Chan |
| 6,523,073 B1 | 2/2003 | Kammer et al. |
| 6,553,446 B1 | 4/2003 | Miller |
| 6,735,642 B2 | 5/2004 | Kagan et al. |
| 6,947,442 B1 | 9/2005 | Sato et al. |
| 6,948,094 B2 | 9/2005 | Schultz et al. |
| 6,990,594 B2 | 1/2006 | Kim et al. |
| 7,100,020 B1 | 8/2006 | Brightman et al. |
| 7,159,221 B1 | 1/2007 | Willen et al. |
| 7,191,240 B1 | 3/2007 | Johnson et al. |
| 7,281,172 B2 | 10/2007 | Chujo |
| 7,398,382 B2 | 7/2008 | Rothman et al. |
| 7,506,084 B2 | 3/2009 | Moerti et al. |
| 7,509,391 B1 | 3/2009 | Chauvel et al. |
| 7,587,575 B2 | 9/2009 | Moertl et al. |
| 7,590,817 B2 | 9/2009 | Moertl et al. |
| 7,617,377 B2 | 11/2009 | Moertl et al. |
| 7,681,012 B2 | 3/2010 | Verma et al. |
| 7,685,476 B2 | 3/2010 | Andre et al. |
| 7,802,256 B2 | 9/2010 | Havens et al. |
| 7,908,335 B1 | 3/2011 | Citterelle et al. |
| 7,941,682 B2 | 5/2011 | Adams |
| 8,230,248 B2 | 7/2012 | Dance et al. |
| 8,255,725 B2 | 8/2012 | Shimazaki et al. |
| 8,310,965 B1 | 11/2012 | Zhang et al. |
| 8,352,624 B2 | 1/2013 | Zimmerman et al. |
| 8,422,404 B2 | 4/2013 | Taki |
| 8,555,099 B2 | 10/2013 | Marinkovic et al. |
| 8,635,412 B1 | 1/2014 | Wilshire |
| 8,656,228 B2 | 2/2014 | Check et al. |
| 8,769,168 B2 | 7/2014 | Moertl et al. |
| 8,788,822 B1 | 7/2014 | Riddle |
| 8,808,091 B2 | 8/2014 | Shaw et al. |
| 8,819,386 B1 | 8/2014 | Mather |
| 8,832,331 B2 | 9/2014 | Co et al. |
| 8,914,649 B2 | 12/2014 | So et al. |
| 9,152,580 B1 | 10/2015 | Chau et al. |
| 9,170,957 B2 | 10/2015 | Touzni et al. |
| 9,280,360 B2 | 3/2016 | Xu et al. |
| 9,547,535 B1 | 1/2017 | Wilt |
| 9,568,970 B1 | 2/2017 | Kaushal et al. |
| 9,582,448 B2 | 2/2017 | Saitou |
| 9,594,718 B2 | 3/2017 | Kaushik et al. |
| 9,628,211 B1 | 4/2017 | Stoler et al. |
| 9,959,124 B1 | 5/2018 | Herbeck et al. |
| 10,078,361 B2 | 9/2018 | Sanghi et al. |
| 10,146,696 B1 | 12/2018 | Krigovski et al. |
| 2002/0013868 A1 | 1/2002 | West |
| 2002/0169938 A1 | 11/2002 | Scott et al. |
| 2003/0014607 A1 | 1/2003 | Slavin et al. |
| 2003/0086122 A1 | 5/2003 | Parry et al. |
| 2003/0112758 A1 | 6/2003 | Pang et al. |
| 2003/0200413 A1 | 10/2003 | Gurumoorthy et al. |
| 2004/0064589 A1 | 4/2004 | Boucher et al. |
| 2004/0128568 A1 | 7/2004 | O'shea |
| 2004/0179546 A1 | 9/2004 | McDaniel et al. |
| 2004/0268172 A1 | 12/2004 | Kates et al. |
| 2005/0033947 A1 | 2/2005 | Morris et al. |
| 2005/0076196 A1 | 4/2005 | Zimmer et al. |
| 2005/0108385 A1 | 5/2005 | Wechter et al. |
| 2005/0114620 A1 | 5/2005 | Justen |
| 2005/0117601 A1 | 6/2005 | Anderson et al. |
| 2005/0149711 A1 | 7/2005 | Zimmer et al. |
| 2005/0285862 A1 | 12/2005 | Noda et al. |
| 2006/0039285 A1 | 2/2006 | Chapman et al. |
| 2006/0047989 A1 | 3/2006 | Delgado et al. |
| 2006/0107071 A1 | 5/2006 | Girish et al. |
| 2007/0005869 A1 | 1/2007 | Balraj et al. |
| 2007/0043901 A1 | 2/2007 | Wu et al. |
| 2007/0070997 A1 | 3/2007 | Weitz et al. |
| 2007/0083687 A1 | 4/2007 | Rinaldi et al. |
| 2007/0180041 A1 | 8/2007 | Suzuoki |
| 2007/0226417 A1 | 9/2007 | Davis |
| 2008/0010563 A1 | 1/2008 | Nishimura |
| 2008/0046689 A1 | 2/2008 | Chen et al. |
| 2008/0077816 A1 | 3/2008 | Ravichandran |
| 2008/0183931 A1 | 7/2008 | Verm et al. |
| 2008/0218225 A1* | 9/2008 | Shibayama ............... G06F 1/12 327/144 |
| 2008/0244259 A1 | 10/2008 | Zimmer et al. |
| 2009/0109230 A1 | 4/2009 | Miller et al. |
| 2009/0113141 A1 | 4/2009 | Bullman et al. |
| 2009/0138650 A1 | 5/2009 | Lin et al. |
| 2009/0177847 A1 | 7/2009 | Ceze et al. |
| 2009/0225818 A1 | 9/2009 | Dapper et al. |
| 2009/0282050 A1 | 11/2009 | Thomas et al. |
| 2009/0282088 A1 | 11/2009 | Thomas et al. |
| 2010/0017655 A1 | 1/2010 | Gooding et al. |
| 2010/0027729 A1 | 2/2010 | Murphy et al. |
| 2010/0030932 A1 | 2/2010 | Ergas et al. |
| 2010/0098419 A1 | 4/2010 | Levy et al. |
| 2011/0022859 A1 | 1/2011 | More et al. |
| 2011/0029696 A1 | 2/2011 | Uehara |
| 2011/0035575 A1 | 2/2011 | Kwon et al. |
| 2011/0083002 A1 | 4/2011 | Albers et al. |
| 2011/0248865 A1 | 10/2011 | Hong et al. |
| 2011/0257983 A1 | 10/2011 | Rathonyi et al. |
| 2011/0283031 A1 | 11/2011 | Lee |
| 2011/0320861 A1 | 12/2011 | Bayer et al. |
| 2012/0017063 A1 | 1/2012 | Hummel et al. |
| 2012/0072658 A1 | 3/2012 | Hashimoto et al. |
| 2012/0084483 A1 | 4/2012 | Sanjive |
| 2012/0102307 A1 | 4/2012 | Wong |
| 2012/0159513 A1 | 6/2012 | Pakhunov et al. |
| 2012/0306553 A1 | 12/2012 | Kim et al. |
| 2013/0124895 A1 | 5/2013 | Saha et al. |
| 2013/0138840 A1 | 5/2013 | Kegel et al. |
| 2013/0173950 A1* | 7/2013 | Banerjea ............... G06F 1/04 713/503 |
| 2013/0290947 A1 | 10/2013 | Li |
| 2014/0033220 A1 | 1/2014 | Campbell et al. |
| 2014/0122828 A1 | 5/2014 | Kagan et al. |
| 2014/0173236 A1 | 6/2014 | Kegel |
| 2014/0189057 A1 | 7/2014 | Sankoda et al. |
| 2014/0211894 A1 | 7/2014 | Yang et al. |
| 2014/0215236 A1 | 7/2014 | Heinrich et al. |
| 2014/0244866 A1 | 8/2014 | Manula et al. |
| 2015/0212806 A1 | 7/2015 | Hsieh |
| 2015/0293873 A1 | 10/2015 | Shao et al. |
| 2015/0309650 A1 | 10/2015 | Ahmed et al. |
| 2015/0309940 A1 | 10/2015 | Kumar et al. |
| 2015/0378737 A1 | 12/2015 | Debbage et al. |
| 2016/0034195 A1 | 2/2016 | Li et al. |
| 2016/0041852 A1 | 2/2016 | Suarez et al. |
| 2016/0070323 A1 | 3/2016 | Patil et al. |
| 2016/0077989 A1 | 3/2016 | Pulyala et al. |
| 2016/0091959 A1 | 3/2016 | Barak et al. |
| 2016/0142988 A1 | 5/2016 | Powell et al. |
| 2016/0179157 A1 | 6/2016 | Ardanaz et al. |
| 2016/0266633 A1* | 9/2016 | Rabii ............... G06F 1/3287 |
| 2016/0269991 A1 | 9/2016 | Van et al. |
| 2016/0299860 A1 | 10/2016 | Harriman et al. |
| 2016/0363955 A1 | 12/2016 | Stevens et al. |
| 2017/0108912 A1 | 4/2017 | Li et al. |
| 2017/0177222 A1 | 6/2017 | Singh et al. |
| 2017/0222943 A1 | 8/2017 | Yao et al. |
| 2017/0228481 A1 | 8/2017 | Pusuluri et al. |
| 2017/0269675 A1 | 9/2017 | Klacar et al. |
| 2017/0286300 A1 | 10/2017 | Doshi et al. |
| 2018/0074572 A1 | 3/2018 | Bauman et al. |
| 2018/0101498 A1 | 4/2018 | Cosby et al. |
| 2018/0160155 A1 | 6/2018 | Iguchi et al. |
| 2018/0162770 A1 | 6/2018 | Hawtof et al. |
| 2018/0225251 A1 | 8/2018 | Sthoeger et al. |

(56) References Cited

U.S. PATENT DOCUMENTS

2018/0367460 A1    12/2018   Gao et al.
2019/0073011 A1    3/2019   Paterson et al.
2020/0019208 A1    1/2020   You et al.

FOREIGN PATENT DOCUMENTS

KR     20150041072 A    4/2015
KR     20150079788 A    7/2015

\* cited by examiner

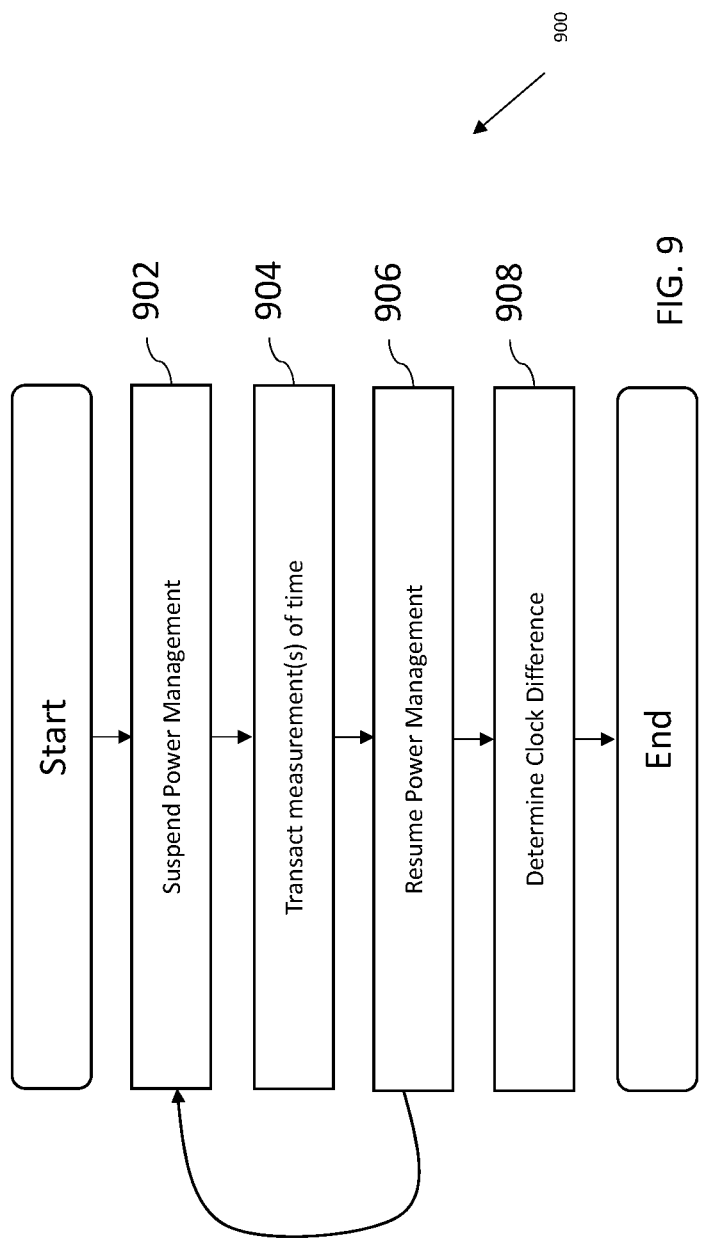

METHODS AND APPARATUS FOR SYNCHRONIZATION OF TIME BETWEEN INDEPENDENTLY OPERABLE PROCESSORS

PRIORITY

This application claims the benefit of priority to U.S. Provisional Patent Application Ser. No. 62/739,002 filed Sep. 28, 2018 and entitled "METHODS AND APPARATUS FOR SYNCHRONIZATION OF TIME BETWEEN INDEPENDENTLY OPERABLE PROCESSORS", which is incorporated herein by reference in its entirety.

RELATED APPLICATIONS

This application is related to commonly owned U.S. patent application Ser. No. 15/840,473 entitled "METHODS AND APPARATUS FOR SCHEDULING TIME SENSITIVE OPERATIONS AMONG INDEPENDENT PROCESSORS" and filed Dec. 13, 2017; Ser. No. 15/720,603 entitled "METHODS AND APPARATUS FOR TRANSMITTING TIME SENSITIVE DATA OVER A TUNNELED BUS INTERFACE" and filed Sep. 29, 2017; Ser. No. 16/049,624 entitled "METHODS AND APPARATUS FOR VERIFYING COMPLETION OF GROUPS OF DATA TRANSACTIONS BETWEEN PROCESSORS" and filed Jul. 30, 2018; Ser. No. 14/879,024 entitled "METHODS AND APPARATUS FOR RUNNING AND BOOTING AN INTER-PROCESSOR COMMUNICATION LINK BETWEEN INDEPENDENTLY OPERABLE PROCESSORS" and filed Oct. 8, 2015; Ser. No. 14/879,027 entitled "METHODS AND APPARATUS FOR MANAGING POWER WITH AN INTER-PROCESSOR COMMUNICATION LINK BETWEEN INDEPENDENTLY OPERABLE PROCESSORS" and filed Oct. 8, 2015; Ser. No. 14/879,030 entitled "METHODS AND APPARATUS FOR RECOVERING ERRORS WITH AN INTER-PROCESSOR COMMUNICATION LINK BETWEEN INDEPENDENTLY OPERABLE PROCESSORS" and filed Oct. 8, 2015; and Ser. No. 14/548,032 entitled "METHODS AND APPARATUS FOR SYNCHRONIZATION OF MEDIA PLAYBACK WITHIN A WIRELESS NETWORK" and filed Nov. 19, 2014 (now issued as U.S. Pat. No. 10,085,224); each of the foregoing incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Technological Field

The present disclosure relates generally to the field of electronics devices, as well as networks thereof. More particularly, and in one exemplary aspect, the disclosure is directed to methods and apparatus for synchronizing time references between independently operable processors. In various exemplary aspects, the present disclosure is directed to ensuring that the independently operable processors accurately measure and report their time references.

2. Description of Related Technology

As is well known within the electronic circuit design arts, high speed integrated circuit (IC) design typically requires consistent and accurate distribution of a time reference. Specifically, an accurate time reference is required to, inter alia, ensure that data is processed correctly and consistently throughout the integrated circuit. Media processing is one specific area of the processing arts where timing problems can result in performance issues that are easily perceptible to humans. For example, audio playback with a glitchy or irregular clock can result in audible artifacts and distortions. Similarly, video playback with poor quality clocks may result in visible freezing, "chunking", etc. Typically, video errors on the order of a few milliseconds can be perceived whereas audio errors can be perceived within a few microseconds (the human ear is more sensitive to anomalies).

Typical solutions for time synchronization provided time information from a "master" processor to "slave" processors. More directly, one processor is the master and controls other processors that derive their time reference therefrom. However, consumer devices and computer systems have grown more sophisticated over time, and this has led to architectures that incorporate multiple independently operable processing components (e.g., where neither processor is master or slave). Each of these multiple processors play a distinct role in accomplishing one or more functions of e.g., a consumer device (e.g., smartphone, tablet, laptop, phablet, smartwatch, portable media players, smart home device, intelligent personal assistant).

One such implementation of a multi-processor architecture is based on an inter-processor communication (IPC) link that is derived from Peripheral Component Interconnect Express (PCIe) technology. PCIe was originally designed for desktop and/or server applications. However, unlike desktop computing applications, the IPC link is designed for use with independently operable processors that may have different power and time domains. Each independently operable processor utilizes an internal free-running oscillator to generate internal clocking. Due to manufacturing variance and tolerances in oscillator components, each processor must assume that the other processor is not aligned to its time reference. More directly, either processor may be e.g., enabled/disabled and/or drift faster/slower relative to the other.

Unfortunately, time synchronization between independently operable processors is complicated by a variety of factors. For example, neither independently operable processor controls the other processor's task scheduling. In fact, it is not always clear which processor should be the time reference. There may be situations where an application processor must align to the baseband processors time reference because the baseband reference must transmit and receive according to strict network scheduling. Similarly, there may be situations where a baseband processor must align to the application processor's time reference so as to ensure that media is timely rendered.

Moreover, messaging that is sent from one processor to the other may not be timely received and/or processed. In fact, a processor that is in low power modes may not even receive messaging until it exits the low power mode. Additionally, each processor may have its own free running oscillators that are affected by different physical component behaviors; for instance, clock frequency can "ramp up"

when exiting low power modes, and can "ramp down" when entering low power modes. Processor activity and/or nearby circuitry may also affect clock behaviors differently.

To these ends, solutions for coordinating independently operable processors as to when to perform, measure, and/or interpret messaging for time synchronization. More generally, improved methods and apparatus are needed for synchronizing time references between independently operable processors.

SUMMARY

The present disclosure provides, inter alia, improved apparatus and methods for synchronizing time references between independently operable processors.

In one aspect, a method for synchronizing time references between independently operable processors is disclosed. In one embodiment, the method includes: suspending a coordinated state machine associated with a first and a second processor; transacting a first measurement of time associated with the first processor; transacting a second measurement of time associated with the second processor; resuming the coordinated state machine; and determining a clock difference between the first and the second measurement of time.

In one variant, suspending the coordinated state machine includes a first state machine and a second state machine entering a common state. In such variant, entering the common state includes transitioning to an inter-processor communication (IPC) link into an active mode.

In another variant, the method further includes capturing the first measurement of time when writing to at least one hardware latch. In one such variant, the method further includes capturing the second measurement of time responsive to receiving a signal from the at least one hardware latch.

In yet another variant, the method includes transacting the first measurement of time via a transfer descriptor (TD) via an inter-processor communication (IPC) link. In one implementation, the method includes transacting the second measurement of time via a completion descriptor (CD) via the inter-processor communication (IPC) link. In one such implementation, one or both of the TD and the CD are asynchronous.

In yet another variant, determining the clock difference includes calculating a linear fit of a plurality of time measurements.

In another aspect, an apparatus configured to synchronize two independently operable processors is disclosed. In one embodiment, the apparatus includes: a first processor characterized by a first time reference; a second processor characterized by a second time reference; at least one hardware latch; and a non-transitory computer readable medium. In one exemplary embodiment, the non-transitory computer readable medium includes one or more instructions which when executed by the first processor causes the first processor to: enter a shared state with the second processor; write to the at least one hardware latch and capture a timestamp corresponding to the write; and transact the timestamp with the second processor.

In one variant, the first processor includes an application processor and the second processor includes a baseband processor. In one such variant, the application processor and the baseband processor communicate via an inter-processor communication (IPC) link. In another such variant, the at least one hardware latch is an in-band doorbell accessible via the inter-processor communication (IPC) link. In still another such variant, the at least one hardware latch is an out-of-band general purpose input/output (GPIO) external to the inter-processor communication (IPC) link.

In another variant, the first time reference and second time reference are free-running oscillators.

In another embodiment, the apparatus includes: a first processor characterized by a first time reference; a second processor characterized by a second time reference; at least one hardware latch configured to generate a trigger signal; and a non-transitory computer readable medium. In one exemplary embodiment, the non-transitory computer readable medium includes one or more instructions which when executed by the first processor causes the first processor to: enter a shared state with the second processor; responsive receiving the trigger signal, capturing a timestamp; and transact the timestamp with the second processor.

In one variant, the first processor includes an application processor and the second processor includes a baseband processor. In another variant, the first processor includes a baseband processor and the second processor includes an application processor. In still another variant, the shared state includes an inter-processor communication (IPC) link active mode that enables transactions between the first processor and the second processor. In still other variants, the shared state is a state of a multi-processor state machine.

In yet another aspect, a processor configured to synchronize with another independently operable processor is disclosed. In one exemplary embodiment, the processor is coupled to non-transitory computer-readable medium that include one or more instructions which when executed by the processor, cause the processor to trigger a time synchronization event and transact timestamps via an inter-processor communication link.

In another exemplary embodiment, the processor is coupled to non-transitory computer-readable medium that include one or more instructions which when executed by the processor, cause the processor to observe a time synchronization event and capture timestamps via an inter-processor communication link.

In yet another aspect, a system for enabling multiple processors to share a coordinated multi-processor state machine is disclosed. In one exemplary embodiment, the system includes a consumer electronics apparatus. In one such variant the consumer electronics apparatus is selected from the group including: smartphone, tablet, laptop, phablet, smartwatch, portable media player, smart home device, intelligent personal assistant.

In yet another aspect, a non-transitory computer readable apparatus is disclosed. In one embodiment, the computer readable apparatus includes a storage medium having instructions stored thereon, the instructions, which when executed, are configured to: suspend a coordinated state machine associated with a first and a second processor; transact a first measurement of time associated with the first processor; transact a second measurement of time associated with the second processor; resume the coordinated state machine; and determine a clock difference between the first and the second measurement of time.

Various other methods and/or apparatus configured to, inter alia, synchronize time via a coordinated multi-processor state machine are also disclosed herein. In some variants, the methods and/or apparatus are further configured to optimize for different applications and/or constraints.

Other features and advantages of the present disclosure will immediately be recognized by persons of ordinary skill in the art with reference to the attached drawings and detailed description of exemplary embodiments as given below.

BRIEF DESCRIPTION OF THE DRAWINGS

FIG. 9 is a logical flow diagram of one exemplary method for synchronizing time references between independently operable processors, in accordance with various aspects of the present disclosure.

Figure 1:
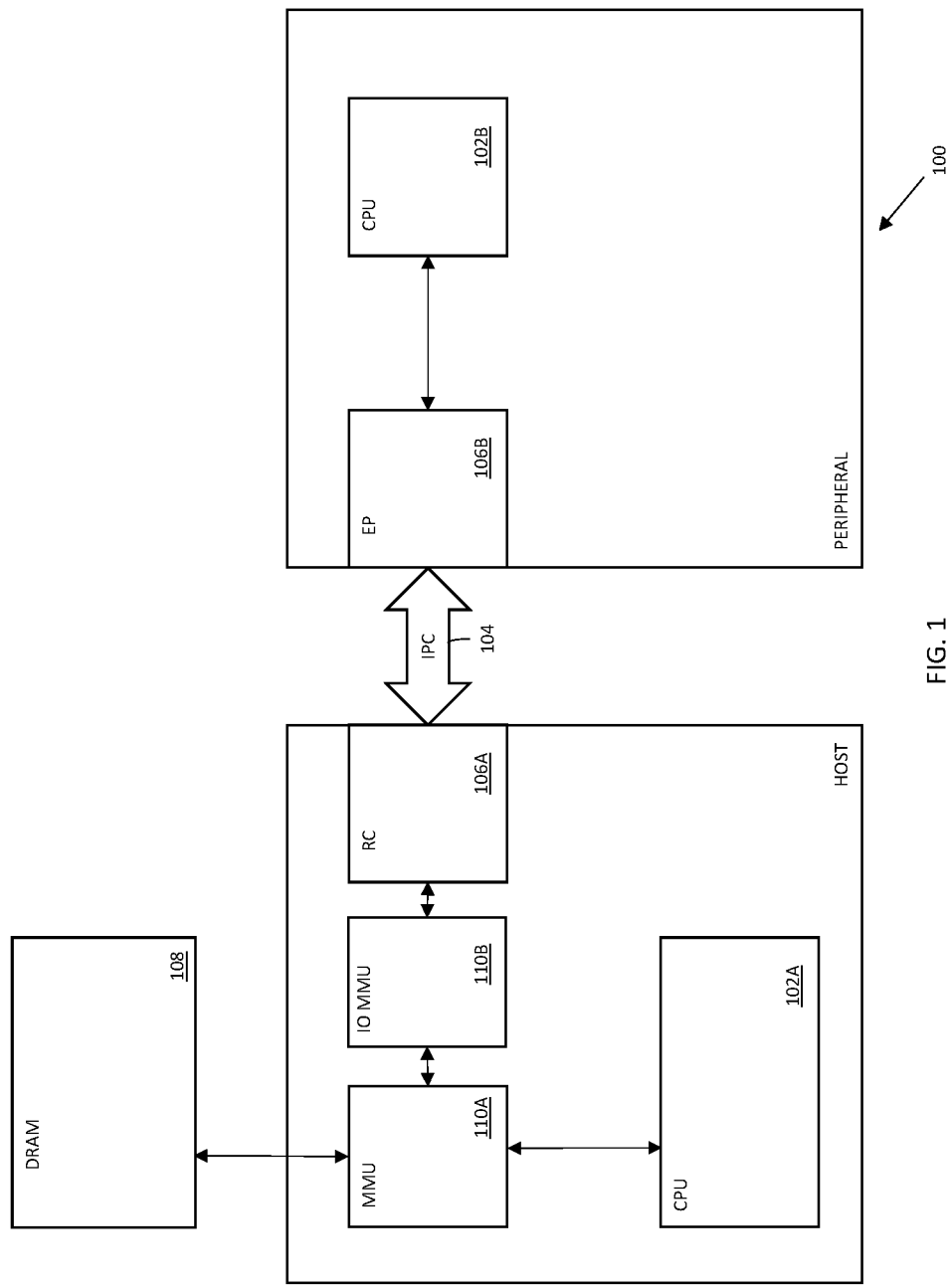
FIG. 1 is a logical block diagram of one exemplary apparatus, useful for explaining various principles described herein.

All Figures © Copyright 2018 Apple Inc. All rights reserved.

DETAILED DESCRIPTION

Reference is now made to the drawings, wherein like numerals refer to like parts throughout.

Detailed Description of Exemplary Embodiments

Exemplary embodiments of the present disclosure are now described in detail. While these embodiments are primarily discussed in the context of an inter-processor communication (IPC) link (for example, of the type described within commonly owned and co-pending U.S. patent application Ser. No. 14/879,024 entitled "METHODS AND APPARATUS FOR RUNNING AND BOOTING AN INTER-PROCESSOR COMMUNICATION LINK BETWEEN INDEPENDENTLY OPERABLE PROCESSORS" and filed Oct. 8, 2015, previously incorporated herein by reference in its entirety), it will be recognized by those of ordinary skill that the present disclosure is not so limited. In fact, the various aspects of the disclosure are useful in any device or network of devices that includes multiple independently operable processors which coordinate to transact time references, as is disclosed herein.
Exemplary Apparatus Bus techniques have evolved which are able to handle faster data rates and provide higher levels of data throughput. As previously noted, one such example bus technology is referred to as a so-called Peripheral Component Interconnect Express (PCIe) bus. PCIe has historically been used as a high-speed serial computer expansion bus technology; PCIe is based on point-to-point connectivity with separate serial links connecting every endpoint component (e.g., graphics card, memory, etc.) to the root complex (e.g., host processor). However, existing PCIe technologies consume significant power and are unsuitable for relatively low-power and low-latency communication protocols used in consumer electronics applications. Current PCIe bus protocols perform operations involving data transactions that are more appropriate for bulk, high-throughput data communication between a "peripheral" processor and the "host" processor.

Within this context, exemplary methods and apparatus are now described which support an inter-processor communication (IPC) link between two (or more) independently operable processors. The following discussions will be described in reference to a "root complex" (RC) or host processor, and an "endpoint" (EP) or peripheral processor. For reasons which will become apparent below, it is appreciated that the designation as to host or peripheral processor is used to simplify and/or clarify the following explanations, and does not imply existing host or peripheral functionality, or that such roles cannot be reversed. Moreover, those of ordinary skill in the related arts will readily appreciate that the various principles described herein, may broadly apply to any network of two (or more) independently operable processors. Further, the various principles described herein may apply to transactions from a host processor to a peripheral processor and vice versa.

As used herein, the term "independently operable processor" refers to a processing system having one or more of the processor clock domain, processor power domain, processor code base, arithmetic units, registers, and/or memory, capable of being isolated to allow the processor to operate without other processors in the processing system. In one embodiment, an independently operable processor can transition into various power-conserving modes independent of the power-conserving modes of other ones of the plurality of sub-systems. In another embodiment, an independently operable processor can adjust its clock frequency, phase, and/or amplitudes, independent of the power-conserving modes of other ones of the plurality of sub-systems. In still another embodiment, an independently operable processor can reboot and/or update its firmware or software independent of the software execution of other ones of the plurality of sub-systems.

As used herein, a "processor" refers generally to any logic or circuitry that responds to and processes computer-readable instructions or firmware that are stored within, for example, a non-transitory computer-readable medium, e.g., a memory. A processor may be embodied in hardware (e.g., an integrated circuit (IC)) that performs logical operations according to the instructions. Examples of processing alternatives include, without limitation, reduced instruction set computer (RISC) processors, complex instruction set computing (CISC) processors, field-programmable gate arrays (FPGAs), application specific integrated circuits (ASICs), and programmable logic devices (PLDs).

As used herein, an "application processor" is a processor that is configured to execute an operating system (OS) and one or more applications, firmware, and/or software. The term "operating system" refers to software that controls and manages access to hardware. An OS commonly supports processing functions such as e.g., task scheduling, application execution, input and output management, memory management, security, and peripheral access. As used herein, the term "application" refers to software that can interact with the hardware only via procedures and interfaces offered by the OS.

As used herein, a "baseband processor" is a processor that is configured to communicate with a wireless network. Common examples of wireless networks include, without limitation, Long Term Evolution/Advanced (LTE and LTE-A) technology, IEEE-Std. 802.11 (any variants thereof), PAN technology such as e.g., Bluetooth (IEEE Std. 802.15.1) or IEEE Std. 802.15.4, "ZigBee", Short Messaging Service (SMS), near field communication (NFC) or radio-frequency identification (RFID), WiMAX (IEEE 802.16), WMANs, 3G cellular (e.g., WCDMA, 3GPP, 3GPP2, and GSM and improvements thereon, and ISM band networks.)

In one embodiment, the IPC bus is managed by a kernel space communication stack that is called and services multiple user space applications. As a brief aside, user space is a portion of system memory that a processor executes user processes from. User space is freely and dynamically allocated for application software opened by (or on behalf) of the user. The kernel space is a portion of memory that a processor executes the kernel from. Kernel space is strictly reserved (usually during the processor boot sequence) for running privileged operating system (OS) processes, extensions, and most device drivers. For example, each user space process normally runs in a specific memory space (its own "sandbox"), and cannot access the memory of other processes unless explicitly allowed. In contrast, the kernel is the core of a computer's operating system; the kernel can exert complete control over all other processes in the system.

The term "operating system" or "kernel" refers to software that controls and manages access to hardware. An OS commonly supports processing functions such as e.g., task scheduling, application execution, input and output management, memory management, security, and peripheral access. As used herein, the term "application" refers to software that can interact with the hardware only via procedures and interfaces offered by the OS.

The term "privilege" refers to any access restriction or permission which restricts or permits processor execution. System privileges are commonly used within the computing arts to mitigate the potential damage of a computer security vulnerability. For instance, a properly privileged computer system will prevent malicious software applications from affecting data and task execution associated with other applications and the kernel.

As used herein, the term "in-kernel" and/or "kernel space" refers to data and/or processes that are stored in and/or have privilege to access to the kernel space memory allocations. In contrast, the terms "non-kernel" and/or "user space" refers to data and/or processes that are not privileged to access the kernel space memory allocations. As a further clarification, user space represents the address space specific to the user process, whereas non-kernel space represents address space which is not in-kernel, but which may or may not be specific to user processes.

As used herein, the term "logical" is used to refer to, without limitation, an abstraction (typically performed in software or machine logic) to represent physical mechanisms, attributes or functionalities as a data structure. For example, as used herein a "logical bus interface," etc., refers generally to an abstraction or representation of a bus interface as a series of data structures. In contrast, a "physical bus interface" as used herein refers to the physical mechanisms, attributes or functionalities of a physically tangible bus interface.

FIG. 1 illustrates apparatus 100 useful for illustrating various principles described herein. As shown, the apparatus 100 includes first and second independently operable processors 102A, 102B, and a physical bus interface 104 that is configured to implement, for example, an inter-processor communication (IPC) link between the two (or more) independently operable processors.

The first and second processor are connected via a bus interface. As used herein, the term "bus interface" refers to any communication system that transfers data between processors and/or peripheral components. A bus interface may include, in part or whole, hardware components (wiring, optical fiber, and other transmission mediums) and/or associated software (including communication protocols and hardware drivers.)

As used herein, an "inter-processor communication link" or "IPC link" refers to any communication bus between two (or more) processors, whether the processors are operating independently, not independently, or a combination thereof. An IPC link may include one or more data pipes that are configured to transfer data from one processor to another, for example, between a host side (e.g., root complex) and peripheral side (e.g., endpoint) of the link. A given data pipe of an IPC link may be configured to transfer the data in a unidirectional or bidirectional fashion.

As used herein, "unidirectional" relates to transmission or reception of data (e.g., instructions, packets, signals) in one direction such that the data is only configured to be transferred from a given computing entity (e.g., logic, circuitry, processor) to another computing entity, but not in the other direction (e.g., from the other computing entity back to the given computing entity).

On the other hand, "bidirectional" or "multidirectional" relates to transaction of data (e.g., instructions, packets, signals) in two or more directions such that the data may be configured to be transferred between a given computing entity (e.g., logic, circuitry, processor) to another computing entity (and vice versa).

In one implementation, the first processor 102A includes an application processor. As shown in FIG. 1, the first processor 102A is coupled to a root complex (RC) 106A which functions as the host of the IPC bus.

In one implementation, the second processor 102B includes a wireless modem. In various embodiments, the second processor 102B includes a Wi-Fi modem, cellular modem, mobile broadband modem, Bluetooth modem, NFC modem, and/or RFID reader, and/or other short-range and long-range protocols so as to include a wireless communication chipset. Other examples of wireless modems include, without limitation devices implementing e.g., IEEE Std. 802.11 (any variants thereof, including Wi-Fi and wireless local area network (WLAN)), PAN technology such as e.g., Bluetooth or IEEE Std. 802.15.4, "ZigBee", NFC or RFID, WiMAX (IEEE 802.16), WMANs, 3G cellular (e.g., Long Term Evolution/Advanced (LTE and LTE-A), WCDMA, 3GPP, 3GPP2, and GSM and improvements thereon), and ISM band devices.

In other embodiments, the second processor 102B may be, e.g., a media processor or other network processing element.

As shown in FIG. 1, the second processor 102B is coupled to an endpoint (EP) 106B which functions as the peripheral of the IPC link.

As used herein, the term "memory" includes any type of integrated circuit or other storage device adapted for storing digital data including, without limitation, ROM, PROM, EEPROM, DRAM, SDRAM, DDR/2 SDRAM, EDO/

FPMS, RLDRAM, SRAM, "flash" memory (e.g., NAND/NOR), and PSRAM. In some cases, the first and/or second processors may have an associated non-volatile memory (e.g., a flash memory) which is configured to store computer readable instructions, and retain the stored computer readable instructions without power. The non-transitory computer readable medium is configured to store computer readable instructions for execution. Such computer-readable instructions may alternatively or additionally be stored on a local cache associated with at least one of the processors.

As used herein, the term "buffer" refers to a device, circuit, logic, or an area of a computing environment that is used to store data temporarily. Typically, buffered data is stored until instructions are given or received to move the stored data to another entity (e.g., processor, memory, another buffer), or "flush" (empty) the buffer. The term "buffer" may be interchangeable with similar terms such as "cache," "queue," "shared memory," or "local memory" depending on the context. In one embodiment, a buffer may be a type of memory. Examples of types of buffers may include, circular or ring buffer, FIFO (first in, first out), LIFO (latest in, first out), round robin, shortest job first, shortest remaining time, high response ratio, dynamic array. In another embodiment, a buffer may refer to a data structure or memory allocation, e.g., data represented by a so-called transfer descriptor (TD), completion descriptor (CD), transfer descriptor ring (TR), completion descriptor ring (CR), or any other such scheme for storing and/or organizing data. Persons of ordinary skill in the relevant art will recognize various other structures and operations related to buffering and temporary data storage.

Both the first and the second processors (102A, 102B) are each coupled to a non-transitory computer readable medium (e.g., dynamic random access memory (DRAM) 108) and one or more memory management units (MMUs). A MMU translates virtual memory addresses (which are allocated within a processor's memory map) to physical addresses in the DRAM 108. In one such implementation, the MMU is further subdivided into a MMU 110A and an Input Output MMU (IO MMU) 110B thereby allowing for the host and peripheral to have distinct memory maps (e.g., a virtual memory-mapped I/O addresses for the host and virtual memory-mapped I/O addresses for the peripheral). While the foregoing split MMU configuration is illustrated, a single MMU (e.g., a shared memory map) or more MMUs (three, four, etc. memory maps) may be substituted with equivalent success given the contents of the present disclosure.

During normal operation, data transactions are generated by the host processor 102A and/or peripheral processor 102B in the form of data pipes. The corresponding MMU 110A (or IO MMU 110B) manage memory accesses according to the data pipes so as to ensure that e.g., the peripheral does not overwrite, monopolize, or otherwise inadvertently interfere with the host's memory allocation, and vice versa. More directly, the MMU 110A and IO MMU 110B provide a degree of isolation (in the form of data pipes and virtual memory maps) from the physical memory (e.g., the DRAM). The isolation between processors ensures that each processor can operate without coordinating accesses with the other, resulting in higher overall system performance.

Figure 2:
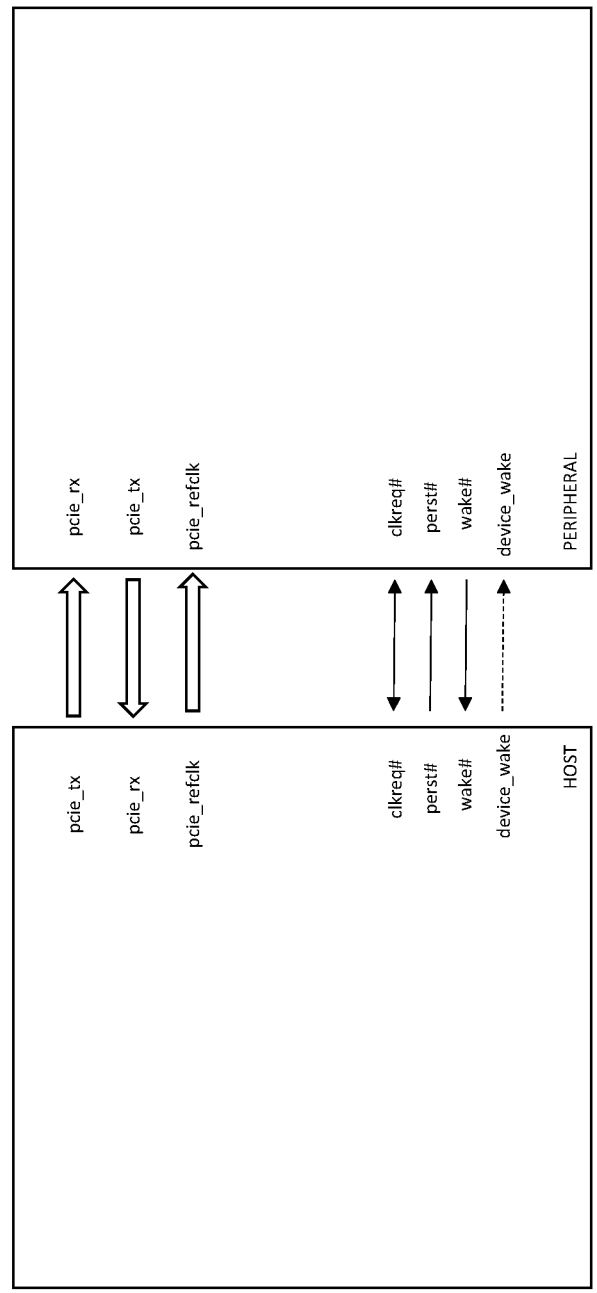
FIG. 2 is a logical block diagram of one exemplary inter-processor communications (IPC) link, useful for explaining various principles described herein.

Now referring to FIG. 2, the physical bus interface 200 includes an IPC link that may be loosely based on the Peripheral Component Interconnect Express (PCIe) standard (e.g., the *PCI Express Base Specification Revision* 4.0 dated Oct. 5, 2017, incorporated herein by reference in its entirety). Those of ordinary skill in the related arts, given the contents of the present disclosure, will readily appreciate that other bus interface standards may be substituted with equal success.

In the exemplary embodiment, the physical bus interface 200 may be a point-to-point communication channel between two IPC ports (the RC and EP) allowing both to send/receive access requests (configuration read/write, I/O read/write, memory read/write) and interrupts. At the physical level, a link is composed of one or more lanes (one shown in FIG. 2), each lane having receive and transmit component (e.g., pcie_rx and pci_tx). Each lane is a full-duplex byte stream, transporting data packets in eight-bit 'byte' formats, between the RC and EP of a link, in both directions simultaneously. The physical bus interface 200 may support multiple logical links (or virtual bus interfaces) representing multiple ongoing data sessions.

In one such embodiment, each virtual bus interface may further include one or more "sessions" which are a persistent and/or semi-persistent set of data transactions (e.g., datagrams) between two logical endpoints. In some embodiments, the session may include "stateful" transactions (i.e., the data transactions are based on a current state of the session), and/or "stateless" transactions (i.e., the data transactions are not based on a current state of the session).

Figure 3:
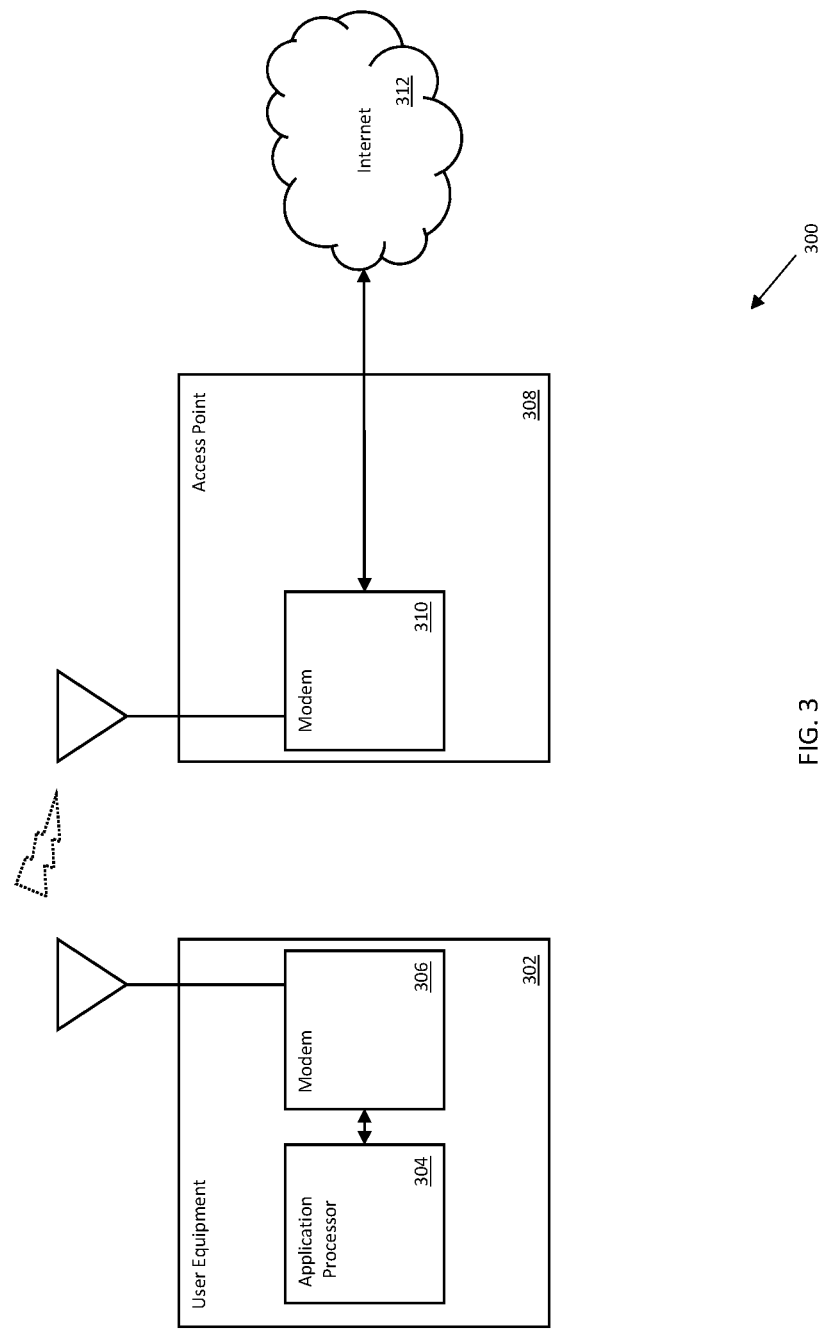
FIG. 3 is a logical block diagram of one exemplary communications network, useful for explaining various principles described herein.

FIG. 3 illustrates a network architecture 300 useful for illustrating various principles described herein. In an embodiment, the architecture 300 includes user equipment 302 that includes a host-side processor (e.g., application processor 304), a peripheral-side processor (e.g., baseband processor 306) and a shared memory module between the application processor 304 and the baseband processor 306. The application processor 304 and baseband processor 306 may include independently operable processors in data communication via an IPC link.

In various embodiments, a user equipment 302 may house the independently operable processors and use the functions thereof. In one embodiment, the user equipment 302 may be a mobile computing device or system for the consumer or end user, such as a smartphone, smartwatch, tablet, or laptop. The user equipment 302 may be configured for wireless connectivity and/or wired connectivity via at least the baseband processor 306. In one variant, the processors include integrated circuits (IC) disposed on a semiconductor die for operation of the user equipment. For example, the baseband processor may include (or be in data communication with) a wireless modem for cellular or Wi-Fi connectivity (or any other means of connectivity, such as Bluetooth, RFID, Global Positioning System (GPS)).

In some embodiments, as shown, the user equipment 302 may be in data communication with other external devices. In one embodiment, the application processor 304 may be connected to an access point 308, by wired or wireless means, via the baseband 310 (via implementations of Wi-Fi, cellular, Bluetooth, NFC, etc.). The access point 308 may in turn enable exchange of data to and from local intranets, the Internet 312, and/or other networks including wireless networks.

In another embodiment, the user equipment may be in data communication with a peripheral device (not shown). Exemplary peripheral devices include, but are not limited to, wireless keyboards, mice, audio equipment (e.g., earbuds, headset, speakers), home and office equipment (e.g., wireless printers), and other user equipment. In some embodiments, the peripheral device may also be in data communication with other networks or devices (e.g., the access point and/or e.g., intranets, the Internet, etc.) to receive and send data.

In the embodiment, the data generated by the application processor 304 may be exchanged via the baseband processor 306 and sent "upstream" to the access point 308, or the data may be transmitted from the access point "downstream" to the application processor 304 via the baseband processor 306. Each of the application processor and the baseband processor may generate its own data for the other processor(s) to process.

Exemplary State Machines—

As a brief aside, the exemplary IPC link power management may be loosely based on the Link Training and Status State Machine (LTSSM) described within the PCIe standard (e.g., the *PCI Express Base Specification Revision* 4.0 dated Oct. 5, 2017, incorporated supra).

Figure 4:
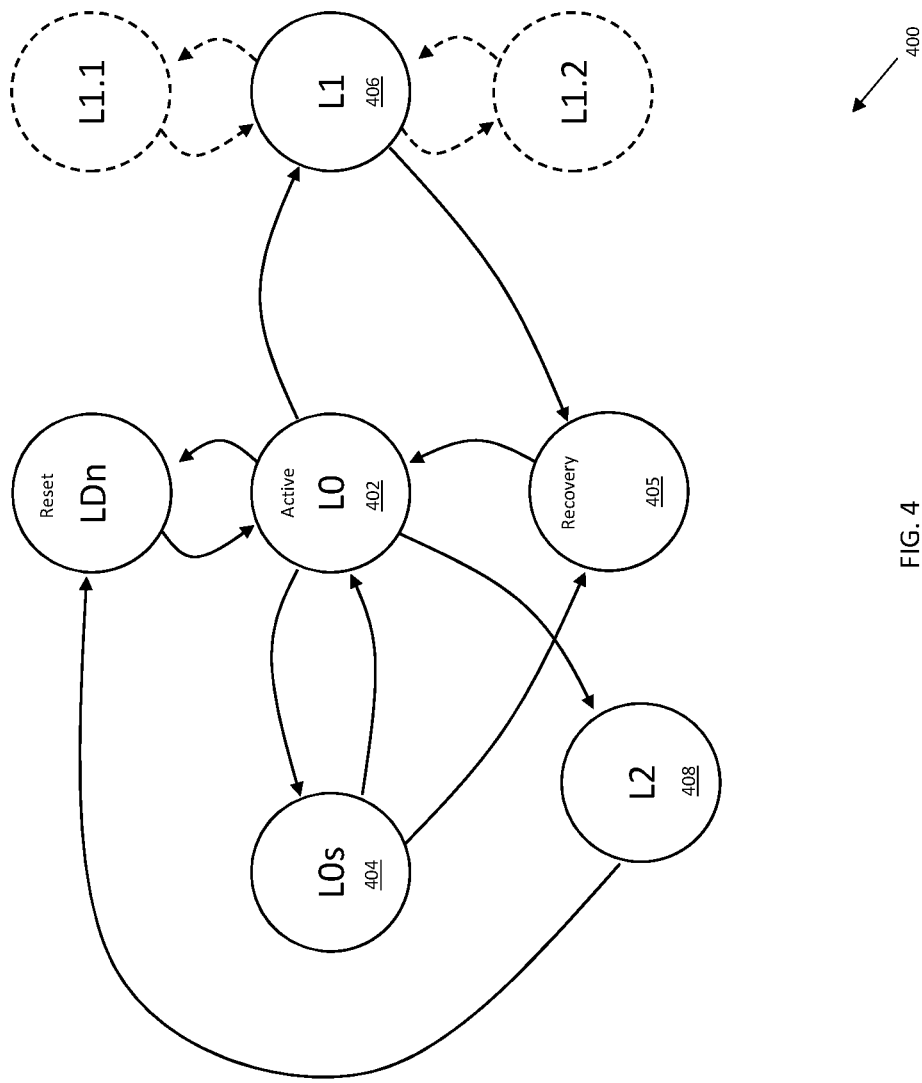
FIG. 4 is a logic diagram of one exemplary Link Training and Status State Machine (LTSSM) useful for power management of an exemplary inter-processor communications (IPC) link, in accordance with the principles described herein.

One such LTSSM 400 is illustrated within FIG. 4; as shown, the state machine 400 includes, inter alia, states L0 402, L0s 404, L1 406, and L2 408.

L0 402 is the operational state of the physical bus interface where data and control packets can be transmitted and received.

L0s 404 is a first power saving state that allows the physical bus interface to quickly enter and recover from a power conservation state without going through a Recovery state 405 for short intervals. If the bus interface has waited too long (resulting in a timer expiration), then the L0s 404 will transition into the Recovery state 405.

L1 406 is a second power saving state that allows additional power savings over L0s 404 at the cost of additional resume latency (due to the Recovery state 405). In one exemplary embodiment, L1 406 may be further sub-divided into e.g., sub-states L1.1 and L1.2. In one implementation thereof, L1.1 allows common-mode voltages of the port circuitry to be maintained while powering off transmit and receive circuitry and associated phase locked loops (PLLs). L1.2 powers off the common-mode voltages in addition to the transmit and receive circuitry and PLLs.

Finally, L2 408 is a third power saving state that aggressively conserves power by turning off most functionality.

Figure 5:
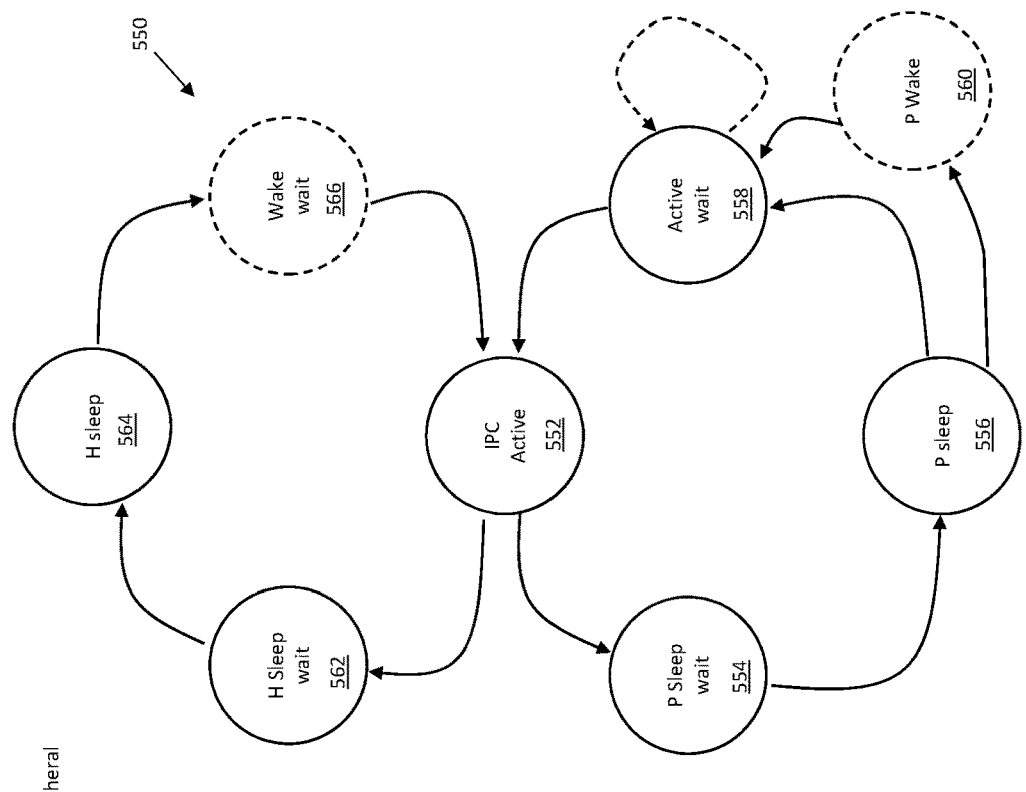
FIG. 5 is a logic diagram showing a multi-processor state machine that is composed of two exemplary power management state machines useful for power management of an exemplary sub-system domain, in accordance with the principles described herein.
Figure 5:
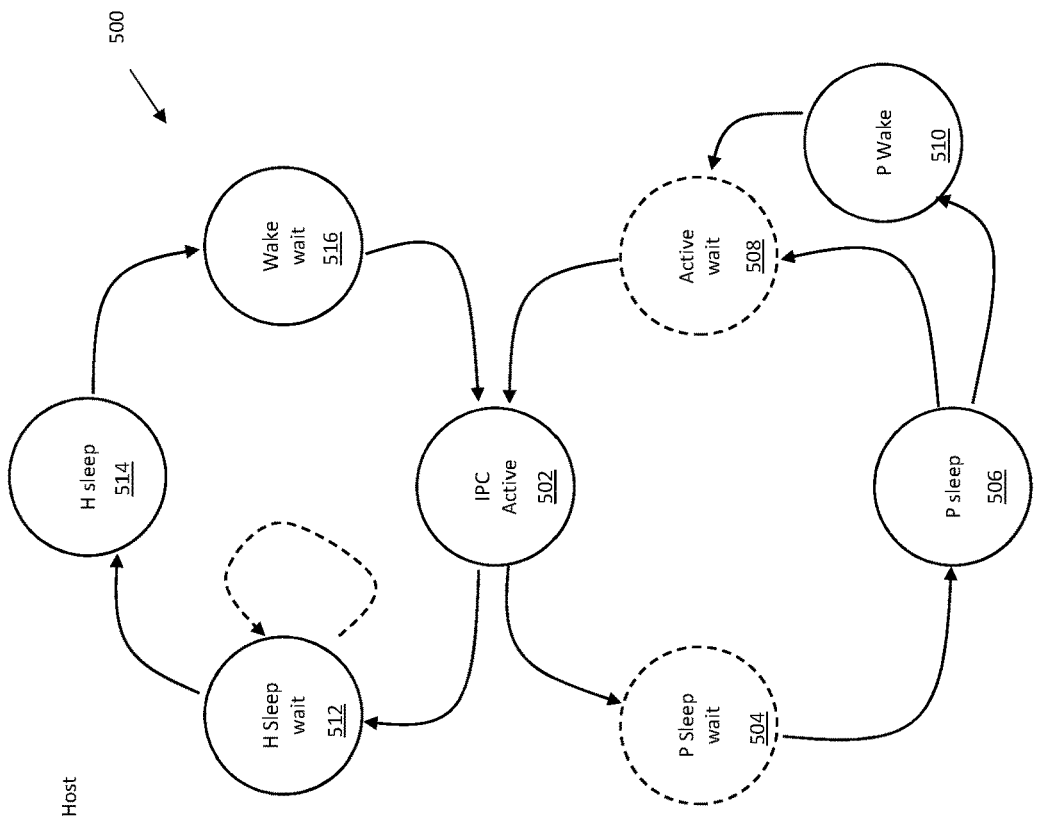

As previously noted, PCIe was not designed for, and thus does not expressly specify, a multi-processor power management state machine for independently operable processors; however FIG. 5 is representative of one such exemplary implementation for the IPC link. As shown, FIG. 5 illustrates a pair of independent state machines 500, 550 within a host processor and a peripheral processor that manage power jointly (collectively as a multi-processor state machine). As depicted, the pair of state machines 500, 550 coordinate the power state of the pair of processors. Even though the processors are independent and do not transition states in lockstep, nevertheless the states generally correspond with one another. For example, when the host state machine 500 transitions into its sleep state (Host Sleep state 514), the peripheral state machine 550 follows (Host Sleep state 564).

The following discussion is presented with regard to the pair of state machines 500, 550; however it is appreciated that a system with a single host and multiple peripherals may have one instance of the host state machine 500 and one instance of the peripheral state machine 550 for each sub-system. Each peripheral's state machine 550 interacts in isolation with the corresponding host state machine 500.

The following discussion describes interactions between a single host state machine and a single peripheral state machine, although it would be appreciated that the following principles would apply to implementations in which multiple independent state machines exist, with the following discussion merely being illustrative of the broader principles for the sake of simplicity. Moreover, artisans of ordinary skill in the related arts given the present disclosure may apply the principles described herein to suit e.g., a sub-system-to-sub-system power sequence, or a sub-system-to-host power sequence.

In one exemplary embodiment, two (2) registers are used by the host and the peripheral to control the state machines 500 and 550. The first register is Sleep Notification that sits in the host memory map and is written to by the peripheral processor. The peripheral processor notifies the host of a write to the Sleep Notification (e.g., via a message signaled interrupt (MSI)). The values for Sleep Notification are "active", "peripheral sleep", and "host sleep". The second register is Sleep Control that sits in the peripheral memory map and is written to by the host processor. The peripheral processor is notified when a write occurs (via e.g., an interrupt). The values for Sleep Control are "active", "peripheral sleep", "peripheral wake", and "host sleep".

Peripheral Initiated Peripheral Sleep and Wake—

Since the peripheral is independent of the host, the peripheral can initiate sleep autonomously, but the host will confirm. Specifically, as shown in FIG. 5 when in the IPC Active state 552 and the peripheral determines that it is likely to go to sleep, it sends a "peripheral sleep" request via the Sleep Notification and enters the Peripheral Sleep Wait state 554. When in this state, the peripheral does not initiate or complete any data transfers or messages. The host, upon seeing the "peripheral sleep" request, updates the Sleep Control register to "peripheral sleep" and enters the Peripheral Sleep state 506 (i.e., the host transitions from IPC Active state 502 to state 504 (state 504 is dotted to indicate that the state is only transitive) and then to Peripheral Sleep state 506). When the peripheral reads the update in the Sleep Control register it can enter the Peripheral Sleep state 556.

When the peripheral is in the Peripheral Sleep state 556 and the peripheral needs to access the IPC link, it sends an "active" request via the Sleep Notification and enters the Active Wait state 558. The peripheral may immediately start accessing the IPC link for transferring data and messages while in the Active Wait state 558, but the peripheral cannot re-enter the Peripheral Sleep state 556 or send a "peripheral sleep" request. Responsive to the "active" request, the host updates the Sleep Control register to "active" and enters the IPC Active state 502 (via the Active Wait state 508, which is only transitive); thereafter the peripheral can enter the IPC Active state 552.

Host Initiated Peripheral Wake—

In some situations, the host needs to wake up the peripheral while the peripheral is sleeping (from Peripheral Sleep state 506, 556). In such situations, the host sends a "peripheral wake" request via the Sleep Control register and enters the Peripheral Wake state 510. Responsive to receiving the "peripheral wake" request, the peripheral updates the Sleep Notification to "active" and enters the Active Wait state 558 (via the transitory Peripheral Wake state 560), where it can immediately start accessing the IPC link to transfer data and messages. As before, the peripheral cannot re-enter Peripheral Sleep state 556 or send a "peripheral sleep" request while in the Active Wait state 558.

Upon receiving "active" in the Sleep Notification, the host writes "active" to Sleep Control (which de-asserts the "peripheral wake" request) and enters the IPC Active state 502 (via the transitory Active Wait state 508). Similarly, once the peripheral receives the update in Sleep Control, it enters the IPC Active state 552.

Host Initiated Host Sleep and Wake—

When in the IPC Active state 502 and the host decides to enter sleep, it sends a "host sleep" request via Sleep Control and enters the Host Sleep Wait state 512. The host can still queue data and messages for transfer over the IPC link from the Host Sleep Wait state 512.

Upon receiving the "host sleep" request, the peripheral enters the Host Sleep Wait state 562 and transfers all pending data and messages. Then the peripheral updates the Sleep Notification to "host sleep" and enters the Host Sleep state 564. When the host receives the update in the Sleep Notification, it can enter the Host Sleep state 514. While in the Host Sleep state 514, no data or messages are transferred by the host or the peripheral.

When in host is in the Host Sleep state 514 and needs to wake up, it sends an "active" request via the Sleep Control and enters the Wake Wait state 516. When in this state, the host can queue data and messages for transfer over the IPC link. However the host cannot re-enter Host Sleep state 514, or send a "host sleep" request.

Upon receiving the "active" request in Sleep Control, the peripheral updates the Sleep Notification to "active" and enters the IPC Active state 552 (via the transitory Wake Wait state 566). When the host receives the update in the Sleep Notification it enters the IPC Active state 502.

Other Variants—

In some embodiments (not shown), the peripheral may need to wake up the host while the host is sleeping (from Host Sleep state 514, 564). In one such embodiment, the peripheral wakes the host by asserting a GPIO (e.g., WAKE #). Waking the host triggers the aforementioned host initiated wake (e.g., refer to Host Initiated Host Sleep and Wake described above).

Artisans of ordinary skill in the related arts, given the contents of the present disclosure, will readily appreciate that other implementations may differ from the foregoing schemes. For example, some alternative implementations may wake the host in an analogous manner as that described above; for example, the peripheral could send a "host wake" request via the Sleep Control and enter a Host Wake state. The host would transition into the Wake Wait state through a transitory Host Wake state. Thereafter both host and peripheral transfer to the IPC Active state. Various other implementations of the foregoing may be substituted with equivalent success given the contents of the present disclosure.

Additionally, it is readily appreciated that a variety of race conditions may occur where independent state machines are coordinated. Different variants may handle race conditions as purely implementation specific details common within the related arts. For example, some race conditions include e.g., where the host sends a "host sleep" request via the Sleep Control register and the peripheral simultaneously sends a "peripheral sleep" request via the Sleep Notification, where the peripheral is in the Active Wait state and the host updates the Sleep Control with "active" but immediately thereafter re-updates with "host sleep" (i.e., before the peripheral state machine has settled into the IPC Active state 552), and where the host is in the Wake Wait state and the peripheral updates the Sleep Notification with "active" but immediately thereafter re-updates with "peripheral sleep" (i.e., before the host state machine has settled into the IPC Active state 502).

More generally, the foregoing description is purely illustrative of one exemplary state machine. Other variants are described in commonly owned and co-pending U.S. patent application Ser. No. 14/879,027 entitled "Methods and Apparatus for Managing Power with an Inter-Processor Communication Link Between Independently Operable Processors", filed Oct. 8, 2015, previously incorporated supra.

Exemplary Inter-Processor Communication (IPC) Link—

Figure 6:
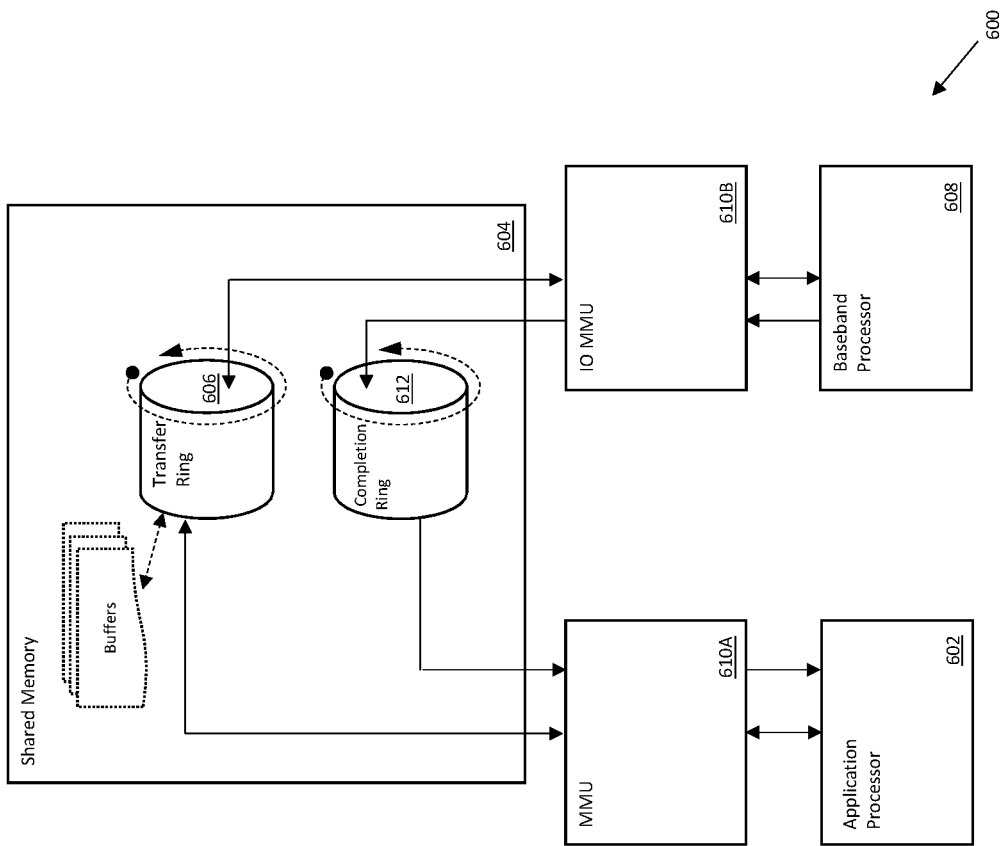
FIG. 6 is a graphical representation of an exemplary inter-processor communication (IPC) data pipe input/output (I/O) transfers, useful for explaining various principles described herein.

FIG. 6 illustrates one exemplary transmission protocol for data transactions between two or more independently operable processor apparatus, via the use of a transfer ring of transfer descriptors (TR/TDs) and a completion ring of completion descriptors (CR/CDs) in a shared memory. While a single TR and CR is illustrated for clarity, the various techniques described herein are generally used with multiple rings operating concurrently.

During operation, a first processor 602 of the independently operable processors (e.g., a host processor or application processor) allocates a transfer ring of transfer descriptors (TR/TDs) within a shared memory apparatus 604 and notifies the other second processor 608 (via ringing a doorbell, writing to a pointer array or message signaled interrupt (MSI), etc.). The TR/TDs are associated with a completion ring of completion descriptors (CR/CDs).

Transfer data may be stored in or written into backing memory buffers that are represented by one or more TDs. In some variants, the data may be contained in the TDs themselves, and the TDs are delivered to and written to the shared memory 604 (via MMU 610A). Specifically, the data may include a payload or information that is to be delivered to the peripheral and/or another device or network entity. In some variants, the data may reside in an external memory, and the one or more TDs may contain data that points to the location in the external memory. The TDs may be placed into a transfer descriptor ring (TR) data structure 606 that resides in the shared memory 604. In one implementation, the first processor 602 may write to a head index that resides in a host-side memory 604, indicating transfer of the TDs.

In various embodiments, the data included in the TD may broadly refer to a payload for delivery to the another processor or another device. A "payload" as used herein broadly refers to a portion of transmitted packetized data that includes an intended message. The payload excludes protocol information used for, e.g., routing the message, error correction, flow control, and other transactional overhead. For example, in addition to the payload, a data packet (including, e.g., a transfer descriptor) may include metadata or other fields sent solely to facilitate the delivery of the payload. In another example, the payload may be included with a segment of a packet that is typically not used for payload delivery, such as a header or footer component of a transfer descriptor.

As a brief aside, there are a wide variety of "data types" used in the computing arts. As used herein, "data types" refer to specific formats or constructions of data that can be classified and/or used by logic (e.g., hardware, firmware, compiler or software, processor, programmable logic, etc.) to identify how the data is being used. Data types are not limited to "natively" understood data types or generic data types; some data types may be dynamically defined in software, and specialized or specifically designed for a particular function or operation.

So-called "value" data types are data types that signify one or more values to the compiler. Common examples of value data types include, without limitation: Booleans, characters, integer numbers, floating-point numbers, and fixed-point numbers. Another family of commonly used data types are so-called "reference" data types; reference data types are interpreted by logic to "refer" to other data. Common examples of reference data types include without limitation, references and pointers. Some hybrid data types may take on the characteristics of either value or reference data types, depending on how they are handled by the logic; such hybrid data types include, without limitation: arrays, multi-dimensional arrays, lists, dictionaries, sets, stacks, queues, and enumerations. For example, a list may be treated as a value and compiled "in-line" (e.g., a compiler copies list values at each instance of the list), or treated as a reference (e.g., the complier references a memory location for each instance of the list).

Within the context of the present disclosure, as used herein, the term "pointer" refers to a specific reference data type that "points" or "references" a location of data in memory. Typically, a pointer stores a memory address that is interpreted by a compiler as an absolute location in system memory or a relative location in system memory based on e.g., a base address, reference address, memory window, or other memory subset. During operation, a pointer is "dereferenced" to recover the data that is stored in the location of memory.

As used herein, the term "descriptor" refers to data structures that indicate how other data is stored. Descriptors generally include multiple parameters and can be used to identify more complex data structures; for example, a descriptor may include one or more of type, size, address, tag, flag, headers, footers, metadata, structural links to other data descriptors or locations, and/or any other number of format or construction information.

As used herein, the term "metadata" refers to data that describes data. Metadata varies widely in application, but generally falls into one of the descriptive, structural, and/or administrative categories. Descriptive metadata describes data in a manner to enable e.g., discovery and/or identification. Common examples include without limitation e.g.: type, size, index tags, and keywords. Structural metadata describes the structure of the data e.g., how compound objects are put together. Common examples include without limitation e.g., prefix, postfix, table of contents, order, and/or any other information that describes the relationships and other characteristics of digital materials. Administrative metadata provides information to help manage a resource; common examples include e.g., authorship and creation information, access privileges, and/or error checking and security based information (e.g., cyclic redundancy checks (CRC), parity, etc.)

As used herein, a "footer" component refers to data associated with, and following, a data structure or a portion thereof (e.g., a transfer descriptor, completion descriptor). As used herein, a "header" component refers to data associated with, and preceding, a data structure or a portion thereof (e.g., a transfer descriptor, completion descriptor). A header or footer may be an optional component of a transfer descriptor or a completion descriptor. Similarly, a header or footer may include data (e.g., a payload) or metadata that describes the descriptor, packet, and/or payload.

Referring back go FIG. 6, the second independently operable processor 608 (e.g., a peripheral processor or baseband processor) reads the TDs on the TR 606 (e.g., via IO MMU 610B), and reads data from, or writes data into, the backing buffers associated therewith. For example, the second processor 608 reads the TDs and/or dereferences the TDs to the corresponding data or payloads that are pointed to by the TDs. The second processor 608 uses explicit completion descriptors (CD) in a completion descriptor ring (CR) 612 to indicate completion status. More directly, the memory or buffer that is pointed to by the TD/TR cannot be freed by the first processor until the corresponding CD/CR has explicitly identified the completion status.

To acknowledge a completion of the data transaction, the second processor 608 may then write one or more CDs to a completion descriptor ring (CR) 612 that resides on the shared memory 604. The first processor 602 may read the CDs on the CR 612 to verify the completed data transaction. The CDs contain information that explicitly indicates to the first processor (i.e., the processor that originated the TDs) that the data has been processed by the second processor 608 and that the memory allocation for the TD/TR can be freed. For example, a given CD may include an identifier of which TD(s) the peripheral retrieved and completed, and/or the address of the buffer accessed to retrieve the data or payload.

The second processor 608 may access, write, pad, use, transmit, discard, and/or otherwise consume the data. For example, the second processor 608 may transmit the data via another communication link (e.g., a wireless link, another IPC link) to another device. In one variant, the second processor 608 may transmit the data upstream to another device via a modem resident (or in data communication with) the second processor. The other device may be wireless devices such as wireless earbuds, a wireless computer mouse, mobile user device, and/or other wired or wireless device.

The foregoing IPC transfer scheme uses shared memory to decouple data transfers between the host and the peripheral. In other words, the host can read and write to the TR/TDs (and CR/CDs) without contending with the peripheral for access, and vice versa. Non-contentious access enables both processors to independently operate without regard to the other processor's tasks and/or scheduling.

While non-contentious access provides many benefits, it also introduces new problems. For example, there are some situations which require tight coordination of processor timing. One such example is timing synchronization of multi-processor architectures. Prior art PCIe systems were mastered by a single "master" processor that controlled the entire system's clocking and power domain. In contrast, the aforementioned IPC system separates clocking and power for each of the independently operable processors (as described in FIGS. 4 and 5 supra). By design, neither independently operable processor controls the other processor's power or clock domain. Thus, messaging that is sent from one processor to the other may not be immediately received and/or processed.

As a related complication, clocking mechanisms that are used in the computing arts are analog components (e.g., crystal oscillators) that are often subject to non-ideal behavior. For example, crystal oscillators will "ramp-up" before settling on its steady state clock frequency, and "ramp-down" when disabled. Consequently, crystal oscillator behavior may be distorted during low power modes and/or when transitioning into/out-of low power modes.

As previously alluded to, timing synchronization is necessary for a variety of applications. For example, timing problems during media replay can result in performance issues that are easily perceptible to humans. To these ends, various aspects of the present disclosure are directed to ensuring that both processors have a stable clock reference to facilitate timing synchronization.

Example Operation

In one exemplary embodiment, mechanisms to transfer system timestamps between the host and peripheral via a "time sync" message are disclosed. Specifically, the "time sync" message is an in-band doorbell interrupt that may include e.g., the direction of timestamp transfer (from host to peripheral, or peripheral to host, etc.), and the unit of the timestamp being captured. In some implementations, the "time sync" message may also provide other fields for e.g., client specific data.

In one exemplary embodiment, the host initiates a time synchronization process by disabling the Link Training and Status State Machine (LTSSM) L1 Active State Power Management (ASPM). Disabling the LTSSM L1 ASPM forces both the host and the peripheral state machines into the L0 (Active) state. In some situations, the host may wait a predetermined interval to ensure that analog clock components for both the host and the peripheral settle to a steady state clock rate.

Once the clocks have settled, the host samples its local time source (clock reference), and immediately rings the "time sync" doorbell interrupt. In one such embodiment, the host has a hardware latch that captures a timestamp when the doorbell interrupt is issued from the root complex of the IPC link. Thereafter, the host re-enables its LTSSM L1 ASPM.

The in-band "time sync" doorbell interrupt is coupled to a hardware latch. Responsive to receiving the in-band "time sync" doorbell, the hardware latch captures a peripheral timestamp in hardware. At this point, timestamps on both the host and the peripheral have been captured.

Timestamps may be transferred via the aforementioned IPC mechanisms (e.g., transfer descriptors (TDs), and completion descriptors (CDs)). In one exemplary variant, the timestamps are transferred with an "asynchronous" or unilateral TD or CD (e.g., the host timestamp TD does not require a corresponding CD, and/or the peripheral timestamp CD is not sent responsive to a TD).

While the foregoing example is presented as a host initiating a time synchronization, artisans of ordinary skill in the related arts will readily appreciate that it is purely illustrative and that time synchronization may also occur in the reverse direction. For example, the peripheral may initiate the time synchronization process, causing both processors to enter the active state L0. Then the peripheral can capture a timestamp and write to the hardware latch, and transact timestamps with the host. More directly, artisans of ordinary skill in the related arts will appreciate that the described time synchronization mechanisms may be unilateral, bilateral, and/or multi-lateral (e.g., for higher order processor systems).

Figure 7A:
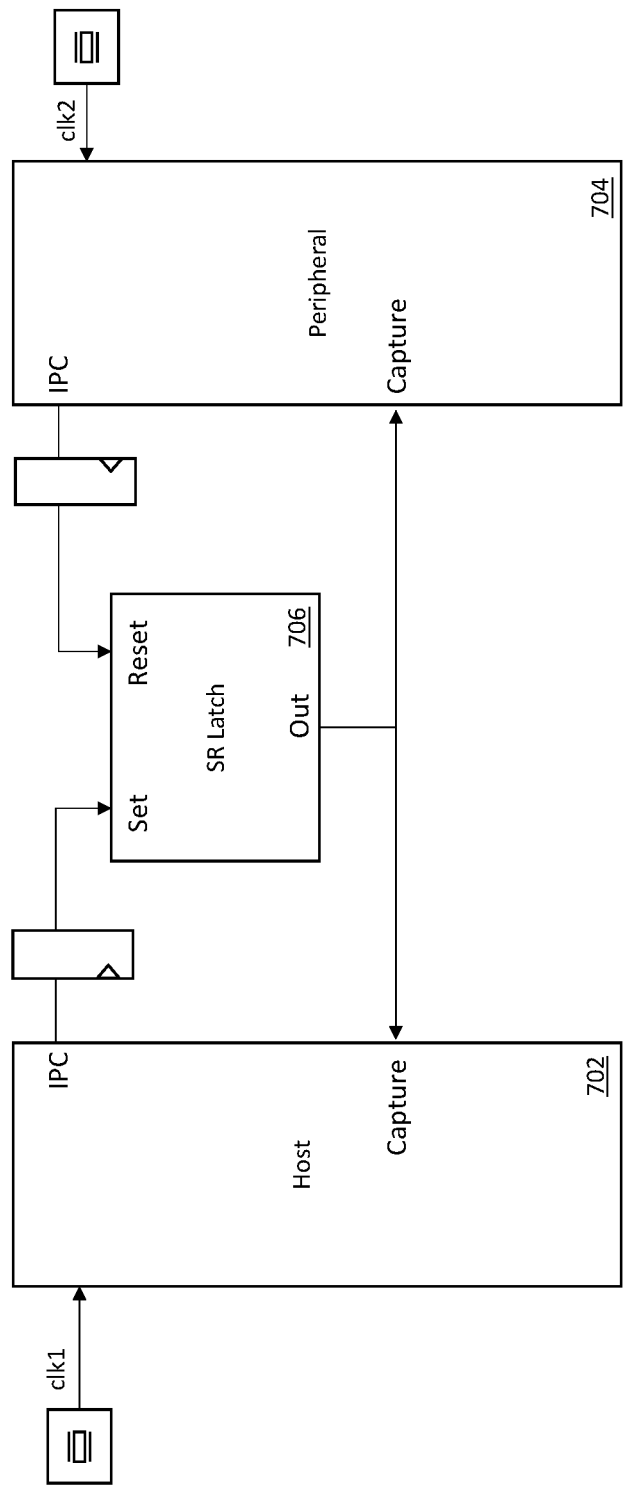
FIGS. 7A and 7B are two logical block diagrams of an exemplary hardware latch, in accordance with various aspects of the present disclosure.

FIG. 7A illustrates one exemplary hardware latch. As shown, the exemplary system includes a host 702, a peripheral 704, and a Set-Reset (SR) latch 706. The host 702 and peripheral 704 are connected via the IPC link (and/or general purpose input/outputs (GPIOs)) that are configured to capture time synchronization signaling. Various implementations may additionally provide enable signaling (enable) to control when time synchronization occurs.

In one exemplary embodiment, the IPC link includes memory mapped registers that set and reset the hardware latch 706. While the aforementioned scheme is described with reference to an "in-band" doorbell interrupt, similar signaling may be performed with an out-of-band general purpose input/output (GPIO) signal. As used herein, the term "in-band" refers to a logical signal conveyed via the IPC link that is used instead of a physical signal. As used herein, the term "out-of-band" refers to a physical signal (external to the IPC link) that is dedicated for signaling.

Figure 7B:
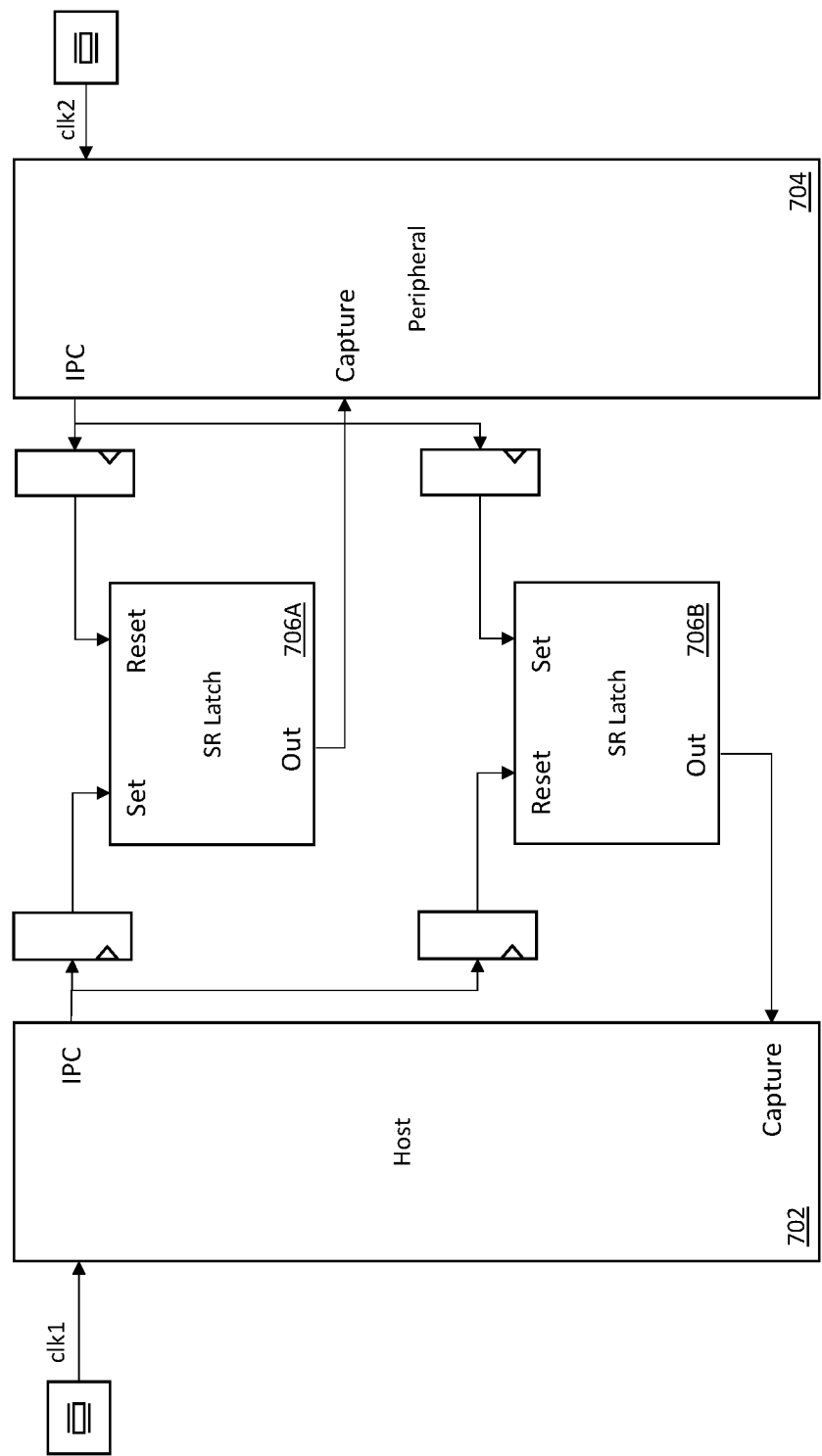

FIG. 7B illustrates another such implementation using multiple hardware latches. As with FIG. 7A, the exemplary system includes a host 702, a peripheral 704; however, in FIG. 7B, the peripheral 704 and host 702 each have a Set-Reset (SR) latch (706A, 706B).

In one such implementation, the host 702 sets the peripheral's latch 706A before sending a doorbell interrupt. Thereafter, when the doorbell interrupt is received at the peripheral endpoint, the latch 706A is reset causing a capture of the timestamp at the peripheral 704. In the reverse direction, the peripheral 704 sets the host's latch 706B when it is ready to receive a doorbell interrupt. When the host root complex fires the doorbell interrupt, the latch 706B is reset causing a capture of the timestamp at the host 702. More directly, the foregoing scheme of FIG. 7B allows the host 702 to precisely latch the time of transmission and the peripheral 704 to precisely latch the time of reception.

Figure 8:
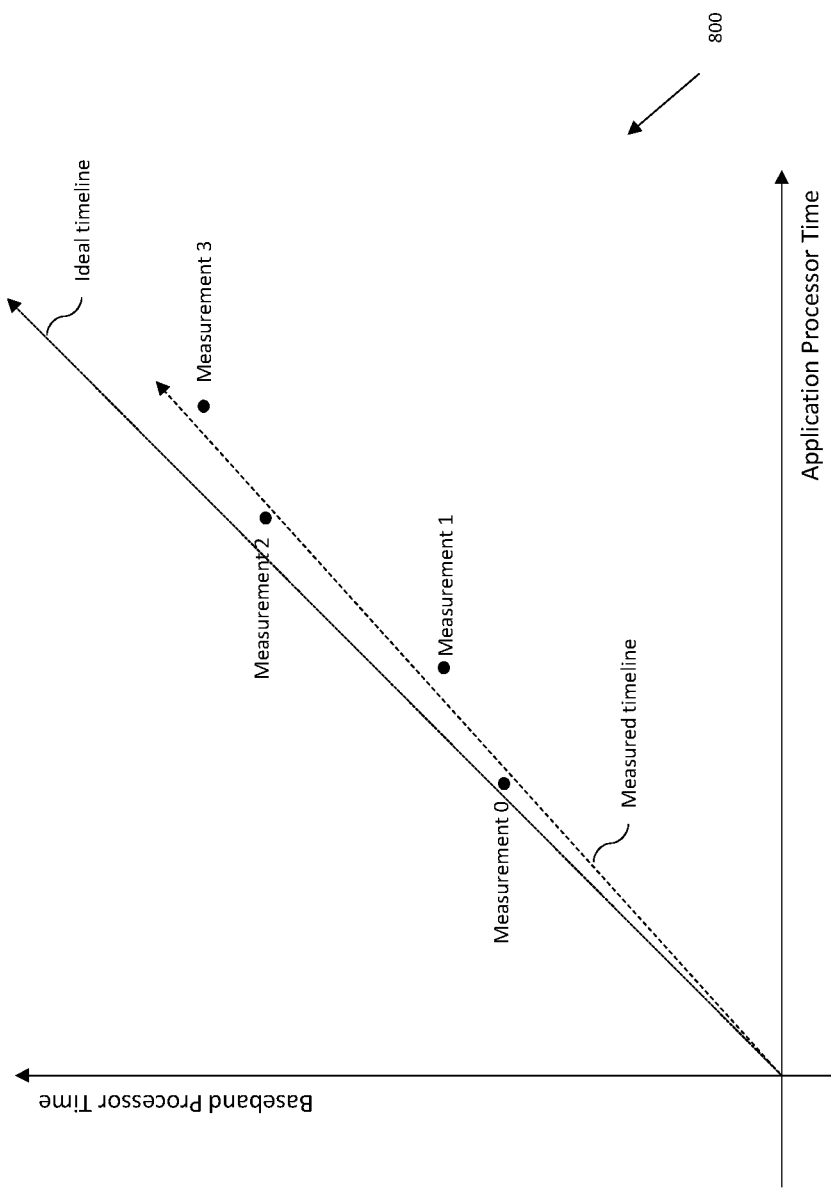
FIG. 8 is a graphical representation of an exemplary timeline inferred from a plurality of measurements, in accordance with various aspects of the present disclosure.

FIG. 8 demonstrates how the captured timestamps can be used to infer a measured timeline. Captured timestamps are plotted in two-dimensional coordinates (application processor timestamp value, baseband processor timestamp value). Measurements will likely suffer some amount of error (due to processing inconsistency, component manufacture, noise, etc.); however, multiple timestamps can be used to infer the actual clock rate discrepancy based on e.g., a linear fit, least squares fit, polynomial regression and/or other fitting algorithm.

The measured timeline can be used by either processor to estimate and/or correct for future clock drift between the processors, based on an ideal timeline. More directly, an "ideal timeline" represents the timeline where time passes at the same rate for both processors (e.g., 1 second of application processor time passes in 1 second of baseband processor time). Thus, if the slope of the measured timeline indicates that the application processor is slightly faster than the baseband processor (e.g., 1 second of application processor time passes in 0.90 seconds of baseband processor time) or vice versa, then the application processor can be slowed down and/or the baseband processor may be sped up.

Methods—

FIG. 9 is a logical flow diagram of one exemplary method 900 for synchronizing time references between independently operable processors, in accordance with various aspects of the present disclosure.

At step 902 of the method 900, one or more processors suspend power management. While the instant disclosure discussion is presented within the context of two processors, the various aspects described herein may apply to any number of processors and/or any processor topology. For example, various techniques described herein may be applied with equivalent success to any number of processors organized according to a bus, tree, star, daisy-chain, or any other network topology. Artisans of ordinary skill in the related arts will further appreciate that the various aspects described herein may be modified to suit any number of processors and/or any processor topology.

In one exemplary embodiment, the time synchronization occurs within a device via chip-to-chip interconnect signaling. While the following sequence is described with respect to a first processor being a time receiver and a second processor being a time transmitter (a unilateral transfer), it is readily appreciated that the following sequence may be bi-directional (e.g., that both processors interchangeably function as time receivers and time transmitters). Moreover, the following exchange is discussed with reference to a baseband processor and an application processor, however artisans of ordinary skill will readily appreciate that the various principles described herein are applicable to a wide range of applications, the disclosed architecture being merely illustrative.

While the foregoing example is presented in the context of processors, other common forms of logic include application specific integrated circuits, programmable logic, and/or dedicated hardware.

In one exemplary embodiment, the one or more processors "coordinate" for one or more operations. As used herein, the term "coordinate" refers to operations which require the participation of two or more entities within a system. In one such implementation, the one or more processors are independently operable and coordinate for a multi-processor power management scheme.

As previously noted, a first processor and the second processor independently manage their operation, including e.g., task scheduling, power state, clock state, and/or other aspects of operation. Notably however, each processor may maintain its independence while coordinating with another processor. For example, as previously alluded to, even though each processor may independently manage its own power state, the multi-processor systems also operates according to a multi-processor state machine. More directly, while each processor can determine its own IPC power state (e.g., L0, L1, L2, etc.), the system of processors also coordinates its activity within the context of the multi-processor state machine (e.g., IPC active, Peripheral Sleep (e.g., peripheral is asleep while host is active), Host Sleep (e.g., host is asleep while the peripheral is active), etc.)

In alternative embodiments, the processors may not be fully independent, for example, one processor may depend on another processor for its operation. For example, existing PCIe based networks are based on a root complex that masters one or more peripheral endpoints. In some such variants, the power management scheme for the one or more processors is mastered by a single entity. Thus, during operation, the root complex may suspend the power state for the PCIe network.

In one exemplary embodiment, suspending the power management scheme results in an active state. Specifically, in one exemplary embodiment, when both processors suspend their Active State Power Management (ASPM) state machine they return to the IPC Active state (which corresponds to e.g., L0 for the PCIe-based LTSSM). In other embodiments, power management is limited but still active; for example, the processors may be able to transition between L0 and L0s. In still other cases, power management may be allowed to cycle states, so long as the clock is settled. While the aforementioned state machine is loosely based on PCIe LTSSM, artisans of ordinary skill in the related arts will readily appreciate that the techniques described herein may be used with a variety of other state machines may be used with equivalent success, given the contents of the present disclosure. Common examples of power management state machine states include: active (L0), low power (L1), sleep (L2), deep sleep (off or reset).

In still other embodiments, the power management scheme for the one or more processors are not coordinated but at least include one common state having known timing characteristics. For example, while the processors may not coordinate on an overall system power state machine, the processors may have a common "synchronization state" that both processors enter in order to perform time synchronization. Exemplary variants of the foregoing merely require that the synchronization state provides the stable timing characteristics such that each processor can measure its corresponding time reference with a degree of accuracy. For example, the synchronization state may include stable power consumption, stabilization times for component settling, and/or stable data traffic. In some variants, the degree of accuracy may be determined by a variety of factors (e.g., application requirements, power consumption, etc.) For example, some bus technologies support varying lane widths (e.g., 1, 2, 4 lanes, etc.) By extension, an link with only one active lane may consume significantly less power and experience less clock interference than an active link with all four lanes active. Consequently, different levels of "activity" may correspond to more or less clock activity, and require greater or less clock accuracy.

In one exemplary variant, the common state is a predetermined state for measuring timestamps. In one exemplary variant, the common state is the active state (e.g., where both processors are active). In other variants, the common state may be more granular. In some variants, the common state for measuring timestamps is configured based on application requirements and/or hardware implications. For example, some variants may have a predefined time synchronization state for e.g., "media playback", "network communications", etc. where the processors use power/clocking that is characteristic for the application requirements and/or any dedicated hardware (such as DSPs or other optimizations). In other variants, the common state can be configured for e.g., worst case, best case, or some other predefined usage. More generally, artisans of ordinary skill in the related arts will readily appreciate that time synchronization is affected by a number of various factors which affect accuracy; the application specific states can be calibrated so as to accurately (or acceptably) mimic application operation.

In other embodiments, the time synchronization process is performed periodically, aperiodically, or on some other as-needed basis. Periodically performing time synchronization may ensure that both processors remain within close time alignment to one another, but such accuracy comes at the cost of more power consumption. In some embodiments, the time synchronization may be performed only on an as-needed basis. For example, when one or more processors enter a low power state and subsequently thereafter they require time synchronization to coordinate for a time sensitive task. More directly, when a processor is in low power state, the time reference will slow down (relative to the other processor's time reference). Upon exiting the low power state, the processors clock references will have drifted relative to one another. Thus, the processors must re-synchronize before performing any time-sensitive tasks.

In some cases, the time synchronization only occurs on an opportunistic basis (e.g., when both processors are already in the same active state). For example, when two processors are already both active (for other tasks), they may briefly suspend power management and perform time synchronization.

At step 904 of the method 900, the one or more processors transact measurements of time. In an exemplary embodiment, a processor provides the other processor a timestamp of a time of an observed event. In some embodiments, the observed event is internal to the multi-processor system. For example, the timestamp may be captured based on an in-band transaction between two processors. In other embodiments, the event is external to the multi-processor system. For example, the timestamp may be captured based on a network event or other external time reference.

In one exemplary embodiment, a first processor captures a timestamp when writing to a hardware latch. Responsive to the hardware latch, a second processor captures its timestamp. The hardware latch provides a time accurate edge signal when it is set and reset. When the latch is set, the latch generates a logic high; when reset, the latch generates a logic low. Thus for example, the processors may both capture timestamps on the rising edge (from logic low to logic high) or falling edge (from logic high to logic low).

Timestamps may represent observed events. In one exemplary embodiment, timestamps may represent transmission or reception of signaling. For example, a hardware latch may capture a timestamp when a doorbell interrupt is sent. In another example, a hardware latch may capture a timestamp when a doorbell interrupt is received. In some cases, multiple timestamps may be used to represent different perspectives of an event. For example, a timestamp of transmission may correspond to a timestamp of reception and/or vice versa.

While the foregoing discussion is presented in the context of timestamps, other measures of time may be substituted with equivalent success. For example, in some embodiments, the resulting pulse width between latch setting and resetting can be used as a pulse width that is commonly observed by both processors. For example, a number of clock cycles can be counted while the latch is logically high. Differences in clock cycles can be used to infer differences in clock rates (e.g., if one processor captures 99 cycles during a 100 cycle pulse width, then there is a 1% clock mismatch).

As used herein, an "edge triggered" event corresponds to an event at a logical transition from logic low to logic high, or vice versa. As used herein, a "level triggered" event corresponds to an event that occurs according to a logical high or logical low (measured on clock boundaries). In some implementations, the time event may be interrupt driven (e.g., the event interrupts other processing); in other implementations, timing can be polling driven (e.g., a process polls for the event until detected).

Additionally, while the foregoing example is based on an event that is generated by one processor, multiple, one, or none, of the processors may be involved in the generation of the event. For example, if a host sets a latch, the peripheral can reset the latch and both processors can view the resulting pulse edge.

Those of ordinary skill in the related arts will readily appreciate that virtually any observable event may be used, even if the event is not commonly observed. For example, a baseband processor may capture timestamps of an external network signal (e.g., a frame counter having an external network frequency). The application processor can infer from the external network signal both an absolute time (based on e.g., GPS that uses satellite based atomic clocks), the baseband processor time (relative to the absolute time), as well as its own time (relative to either GPS and/or baseband time).

In some embodiments, the common event is generated multiple times. For example, in some cases, the common event is a periodically occurring event. In other embodiments, the common event occurs on an as-needed basis, or on an as-requested basis. In one such variant, a processor may initiate or request a time synchronization event based on a condition e.g., on power-up, on wake-up, in preparation for an upcoming data transfer, an error rate exceeding a maximum threshold, etc.

While the foregoing discussion is described in the context of a register accessible in-band via the IPC link, other embodiments may use an external GPIO to perform the latch operation described above. The direction of the GPIO can be either from the host to the peripheral or vice versa. More generally, signaling may occur either in-band (with other signaling) or out-of-band (via a dedicated signal). Still other common signaling mechanisms include e.g., interrupts, dedicated signaling, and/or other varieties of messaging.

In one exemplary embodiment, the timestamps denotes an event that was observed. Specifically, the host and peripheral captures a timestamp corresponding to a hardware latch. In other embodiments, the timestamps may denote scheduling for an event that will be observed. For example, the host may provide a timestamp corresponding to when the host will write to a hardware latch.

In one exemplary embodiment, the timestamps are transacted via an inter-processor communication (IPC) link. In one such variant, the transactions are provided via a transfer descriptor (TD) and a completion descriptor (CD). In some variants, the transactions are "unilateral or "asynchronous". A unilateral or asynchronous TD does not result in a responding CD. Similarly, a unilateral or asynchronous CD is not responsive to a TD. In other words, timestamps may be provided in one direction in an unsolicited manner (asynchronous CD) and/or without completion (asynchronous TD).

At step 906 of the method 900, the one or more processors resume power management. In one such exemplary embodiment, the processors resume independent power management (e.g., the ASPM state machine is re-enabled). Thereafter the multi-processor state machine can also be enabled (e.g., the host and/or peripheral may independently trigger state transitions).

In one exemplary embodiment, the method may iterate over multiple measurements (from step 902 through step 906). Each iteration corresponds to a measurement interval. In some variants, measurements are taken over multiple measurement intervals (e.g., where a measurement interval is the interval during which power management is suspended). As previously noted, during each measurement interval, the PCIe-based LTSSM is disabled so that both processors return to the active state (L0) (the active state has the highest system power consumption). Thus, by direct extension, longer periods between measurement intervals may result in less accurate measurements. More generally, while the foregoing discussion is presented with respect to regularly measured clock intervals, the techniques described herein may be performed on a periodic, aperiodic, or as-needed basis based on e.g., required accuracy, power consumption, application requirements, idle resource availability, application requirements, and/or other considerations.

At step 908 of the method 900, a processor determines a clock difference based on the one or more time measurements. In one exemplary embodiment, the clock difference corresponds to a difference in timestamp value. In one such variant, the host processor may measure the difference between its timestamp value and the peripheral processor's timestamp value for the same hardware latch signal. Depending on various considerations, the host may either increase or decrease its clock rate, and/or the peripheral may increase or decrease its clock rate. In some embodiments, the processors may additionally either adjust their current time reference (e.g., increase or decrease their time values according to the differences in timestamp).

In one exemplary embodiment, the clock difference corresponds to a difference in clock rate. For example, if the host determines that it is running 10% faster than the peripheral it may slow its clock rate. Similarly, if the peripheral is running 10% slower than the host it may speed its clock rate. In some cases, the two processors may "meet in the middle" (e.g., one slows by 5%, the other speeds up by 5%); in other cases, one or both of the processors may be required to adjust its rate more. For example, a baseband processor may be unable to change its clock reference due to external considerations (e.g., external network frame timing); in such cases, only the application processor may shift its clocking.

Each clock difference measurement may have some amount of error associated therewith. Accordingly, in some embodiments, the first and second processor analyze a current rate mismatch within the context of historical data (e.g., previously gathered mismatch data), so as to improve the estimation accuracy. In some cases, the first and second processor may weight various rate mismatch determinations so as to optimize for estimation accuracy, settling time, etc. For example, large rate mismatches may be emphasized to improve responsiveness (i.e., the amount of time required for the two processors to achieve synchronization), or alternatively large rate mismatches can be disregarded as outlier data points.

In one exemplary embodiment, the clock difference is used to infer a mathematical relationship between the clock domains. In one embodiment, the mathematical relationship is inferred by a linear fit. Other factors may be considered including historical performance. More directly, even though each individual observation may have some error; a historical analysis of multiple observations can be used to estimate a more accurate relationship between the clock domains (e.g., based on a best fit linear analysis, polynomial fit, least squares, etc.). More directly, the progression of the observed data points can be used to calculate an "ideal timeline" (which is a mathematical relationship rate of clock drift), and the error can be measured. In other words, a measured timeline that deviates from an ideal timeline (i.e., where 1 second of application processor time passes in 1 second of baseband processor time) determines the amount of correction that is necessary.

In one exemplary embodiment, multiple timestamps are measured during steps 902 through 906. In some variants, measurements may be taken periodically, aperiodically, or on an as-needed basis. In other embodiments, a single measurement is taken. As can be appreciated by those of ordinary skill, more measurements may provide higher accuracy at higher power consumption (e.g., because the measurements are taken over a longer period); fewer measurements may provide lower accuracy but can be performed faster and with less power consumption.

In still other embodiments, the processors measure clock differences in rate. For example, first and second processors determine a rate mismatch based on the common event. In one exemplary embodiment, the first and second processors each independently determine a number of clock pulses (of their respective local clocks) that correspond to e.g., a commonly observed pulse width. By exchanging the determined number, the first and second processors can determine a rate mismatch between their respective local clocks.

In one exemplary embodiment, the one or more processors perform coordinated operations based on the determined clock difference. Common examples of coordinated time operations may include, without limitation, data transfer, media playback, network scheduling, etc. For example, the baseband processor and the application processor may coordinate for a streaming media processing application. During the streaming media operation, the baseband processor receives the streaming media via a network connection and provides the data to the application processor for rendering. In another example, the application processor may capture video and provide the data to a baseband processor for transmission to the network. A variety of other coordinated tasks may be substituted with equivalent success, by artisans of ordinary skill in the related arts given the contents of the present disclosure.

It will be recognized that while certain embodiments of the disclosure are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the embodiments disclosed and claimed herein.

While the above detailed description has shown, described, and pointed out novel features applicable to various embodiments, it will be understood that various omissions, substitutions, and changes in the form and details of the device or process illustrated may be made by those skilled in the art without departing from the principles described herein. The foregoing description is of the best mode presently contemplated. This description is in no way meant to be limiting, but rather should be taken as illustrative of the general principles described herein. The scope of the disclosure should be determined with reference to the claims.

What is claimed is:

1. A method for synchronizing time references between independently operable processors, the method comprising:
   suspending a coordinated state machine associated with a first and a second processor;
   transacting a first measurement of time associated with the first processor;
   transacting a second measurement of time associated with the second processor;
   resuming the coordinated state machine; and
   determining a clock difference between the first and the second measurement of time.

2. The method of claim 1, wherein the suspending of the coordinated state machine further comprises a first state machine and a second state machine entering a common state.

3. The method of claim 2, wherein the entering of the common state further comprises transitioning an inter-processor communication (IPC) link into an active mode.

4. The method of claim 1, further comprising capturing the first measurement of time when writing to a hardware latch.

5. The method of claim 4, further comprising capturing the second measurement of time responsive to receiving a signal from the hardware latch.

6. The method of claim 1, further comprising transacting the first measurement of time via a transfer descriptor (TD) via an inter-processor communication (IPC) link.

7. The method of claim 6, wherein the transacting of the second measurement of time comprises transacting a completion descriptor (CD) via the inter-processor communication (IPC) link.

8. The method of claim 7, wherein one or both of the TD and the CD are asynchronous.

9. The method of claim 1, wherein the determining of the clock difference comprises calculating a linear fit of a plurality of time measurements.

10. An apparatus configured to synchronize two independently operable processors, the apparatus comprising:
    a first processor characterized by a first time reference;
    a second processor characterized by a second time reference;

one or more hardware latches; and a non-transitory computer readable medium comprising one or more instructions which when executed by the first processor causes the first processor to:
- enter a shared state with the second processor;
- write to the one or more hardware latches and capture a timestamp corresponding to the write; and
- transact the timestamp with the second processor.

11. The apparatus of claim 10, wherein the first processor comprises an application processor and the second processor comprises a baseband processor.

12. The apparatus of claim 11, wherein the application processor and the baseband processor communicate via an inter-processor communication (IPC) link.

13. The apparatus of claim 12, wherein the one or more hardware latches comprises an in-band doorbell accessible via the inter-processor communication (IPC) link.

14. The apparatus of claim 12, wherein the one or more hardware latches comprises an out-of-band general purpose input/output (GPIO) external to the inter-processor communication (IPC) link.

15. The apparatus of claim 10, wherein the first time reference and second time reference comprise free-running oscillators.

16. An apparatus configured to synchronize two independently operable processors, the apparatus comprising:
- a first processor characterized by a first time reference;
- a second processor characterized by a second time reference;
- one or more hardware latches configured to generate a trigger signal; and
- a non-transitory computer readable medium comprising one or more instructions which when executed by the first processor causes the first processor to:
  - enter a shared state with the second processor;
  - responsive to receiving the trigger signal, capturing a timestamp; and
  - transact the timestamp with the second processor.

17. The apparatus of claim 16, wherein the first processor comprises an application processor and the second processor comprises a baseband processor.

18. The apparatus of claim 16, wherein the first processor comprises a baseband processor and the second processor comprises an application processor.

19. The apparatus of claim 16, wherein the shared state comprises an inter-processor communication (IPC) link active mode that enables transactions between the first processor and the second processor.

20. The apparatus of claim 16, wherein the shared state comprises a state of a multi-processor state machine, the multi-processor state machine being associated with the first processor and the second processor.

* * * * *